(12) United States Patent
Brown et al.

(10) Patent No.: US 11,939,079 B2
(45) Date of Patent: Mar. 26, 2024

(54) CARGO CONTAINER WITH LINKAGE DEVICES

(71) Applicant: The Boeing Company, Chicago, IL (US)

(72) Inventors: Douglas A. Brown, Chicago, IL (US); William R. Clos, Chicago, IL (US); Kyle Pointer, Chicago, IL (US)

(73) Assignee: The Boeing Company, Chicago, IL (US)

( * ) Notice: Subject to any disclaimer, the term of this patent is extended or adjusted under 35 U.S.C. 154(b) by 205 days.

(21) Appl. No.: 17/483,502

(22) Filed: Sep. 23, 2021

(65) Prior Publication Data

US 2023/0086379 A1 Mar. 23, 2023

(51) Int. Cl.
*B64D 9/00* (2006.01)

(52) U.S. Cl.
CPC ..................... *B64D 9/00* (2013.01)

(58) Field of Classification Search
CPC .......... B64D 9/00; B64D 9/003; B65D 88/14; B65D 90/006; B65D 90/0008; B65D 2590/0008

See application file for complete search history.

(56) References Cited

U.S. PATENT DOCUMENTS

| 4,799,600 | A | * | 1/1989 | Gunn | B65D 88/14 |
| | | | | | 220/1.5 |
| 2008/0116199 | A1 | | 5/2008 | Bublitz et al. | |
| 2010/0089917 | A1 | * | 4/2010 | Gilbert | B65D 88/12 |
| | | | | | 493/405 |
| 2017/0113870 | A1 | | 4/2017 | Looker | |
| 2018/0194548 | A1 | | 7/2018 | Helou | |
| 2021/0163117 | A1 | * | 6/2021 | Huber | B64C 1/1415 |

FOREIGN PATENT DOCUMENTS

| DE | 10-2017-130172 A1 | 6/2019 |
| DE | 102017130176 A1 * | 6/2019 |
| EP | 3 816 037 A1 | 5/2021 |
| JP | 2013216381 A * | 10/2013 |

* cited by examiner

*Primary Examiner* — Joshua J Michener
*Assistant Examiner* — Arfan Y. Sinaki
(74) *Attorney, Agent, or Firm* — McDonnell Boehnen Hulbert & Berghoff LLP

(57) ABSTRACT

Examples include a cargo container for carrying items in an aircraft. The cargo container includes a first sidewall including a first length and a second sidewall including a second length extending transversely from the first sidewall. The first length is greater than the second length. The cargo container further includes a base sidewall extending from the first sidewall and the second sidewall, where the base sidewall is configured to support the cargo container on a cargo support surface of the aircraft. The cargo container further includes a lid configured to couple to the first sidewall, the second sidewall, or the base sidewall to at least partially cover a cavity formed by the first sidewall, the second sidewall, and the base sidewall.

20 Claims, 30 Drawing Sheets

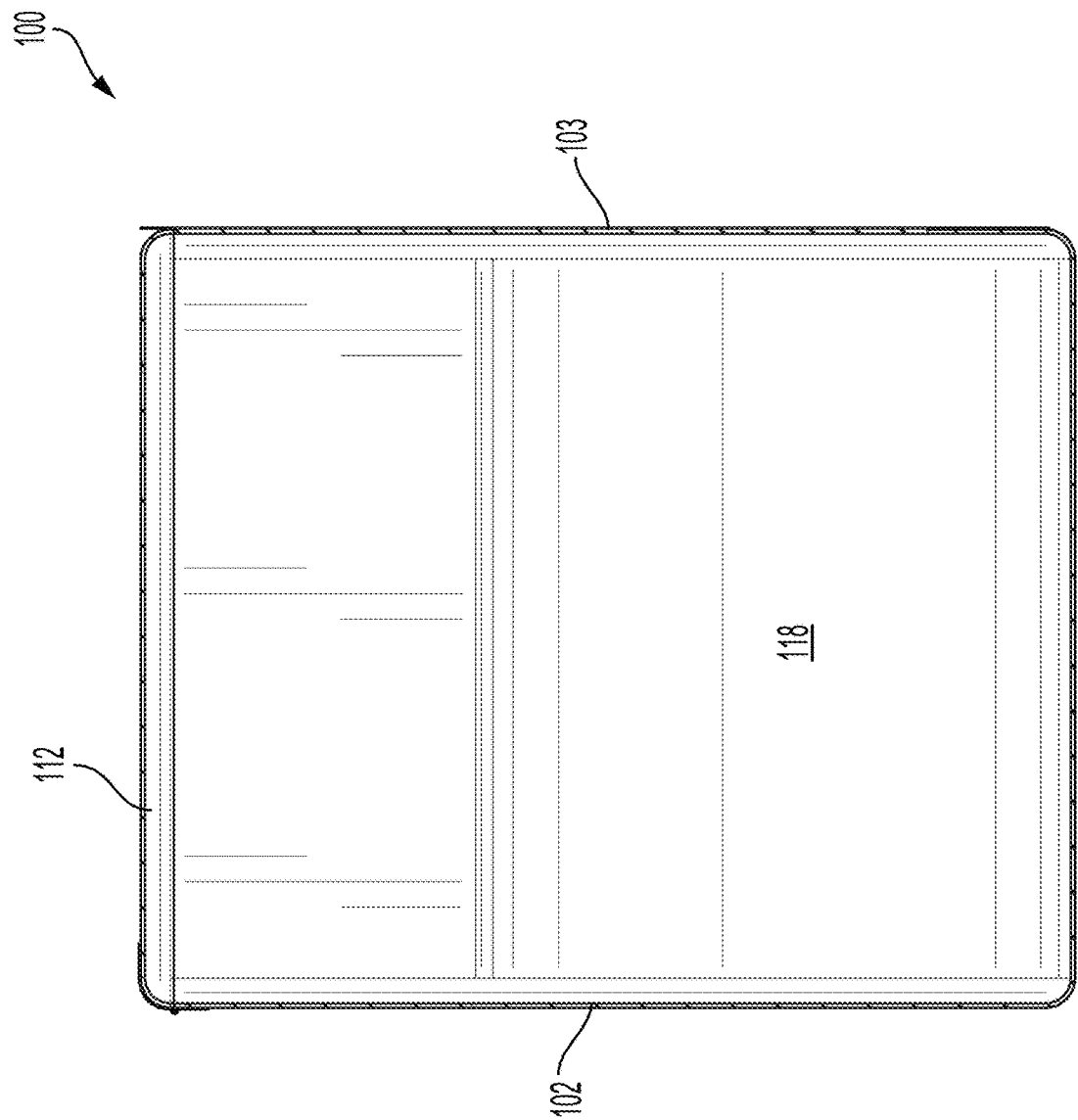

CARGO CONTAINER WITH LINKAGE DEVICES

FIELD

The present disclosure generally relates to cargo containers, and more specifically to cargo containers for carrying items in an aircraft.

BACKGROUND

Aircraft are commonly used to transport cargo in addition to passengers. One common practice for loading cargo such as luggage into an aircraft involves a first handler on the tarmac and a second handler in a cargo area of the aircraft. The first handler places luggage items (e.g., one by one) on the floor of the cargo area near a cargo door and the second handler retrieves the luggage items and stacks them in the cargo area. Other handlers might be involved as well. In some cases, a conveyor system moves the stacked cargo to the rear of the plane so that the second handler can stack additional luggage items. This process can be tedious and unpleasant as the second handler often must crouch or bend over due to the low ceiling of the cargo area. In addition, the process can result in inefficient use of the volume of the cargo area and individual handling of luggage items can increase the risk of mishandling that causes damage.

SUMMARY

One aspect of the disclosure is a cargo container for carrying items in an aircraft, the cargo container comprising: a first sidewall comprising a first length; a second sidewall comprising a second length extending transversely from the first sidewall, wherein the first length is greater than the second length; a base sidewall extending from the first sidewall and the second sidewall, wherein the base sidewall is configured to support the cargo container on a cargo support surface of the aircraft; and a lid configured to couple to the first sidewall, the second sidewall, or the base sidewall to at least partially cover a cavity formed by the first sidewall, the second sidewall, and the base sidewall.

Another aspect of the disclosure is an aircraft comprising: a fuselage; a cargo container area extending through the fuselage, the cargo container area defined by a cargo support surface and opposing sidewalls extending from the cargo support surface; and a plurality of cargo containers within the cargo container area, wherein each cargo container of the plurality of cargo containers comprises opposing sidewalls that extend in a direction that correspond to the opposing sidewalls of the cargo container area.

Another aspect of the disclosure is a method of manufacturing a cargo container, the method comprising: performing a rotational molding process to form a closed container; removing a portion of the closed container, thereby forming a lid and an open container; and attaching the lid to the open container such that the lid can rotate with respect to the open container, thereby forming the cargo container.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The features, functions, and advantages that have been discussed can be achieved independently in various examples or may be combined in yet other examples further details of which can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying Figures.

FIG. 30 is a cross sectional view of a cargo container, according to an example.

DETAILED DESCRIPTION

A need exists for a cargo container that facilitates more efficient and more ergonomic loading of cargo into an aircraft. Examples herein include a cargo container for carrying items in an aircraft. The cargo container includes a first sidewall including a first length and a second sidewall including a second length extending transversely from the first sidewall. The first length is greater than the second length. The cargo container further includes a base sidewall extending from the first sidewall and the second sidewall, where the base sidewall is configured to support the cargo container on a cargo support surface of the aircraft. The cargo container further includes a lid configured to couple to the first sidewall, the second sidewall, or the base sidewall to at least partially cover a cavity formed by the first sidewall, the second sidewall, and the base sidewall. As described below, the cargo container has several features that can facilitate more efficient and ergonomic loading of cargo into an aircraft.

Typical cargo containers used for loading luggage into an aircraft are heavy, large, and expensively constructed when compared to the cargo containers disclosed herein. Because of their heavy weight and/or large size, such conventional cargo containers are subject to various structural requirements of certain regulatory agencies. The cargo containers disclosed herein generally include lightweight materials and are smaller than typical cargo containers (e.g., in a dimension parallel to the longitudinal axis of the aircraft), thus obviating the need to satisfy such regulatory requirements.

Disclosed examples will now be described more fully hereinafter with reference to the accompanying Drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

FIGS. 1-11 are diagrams of structures and functionality related to a cargo container 100.

Figure 1:
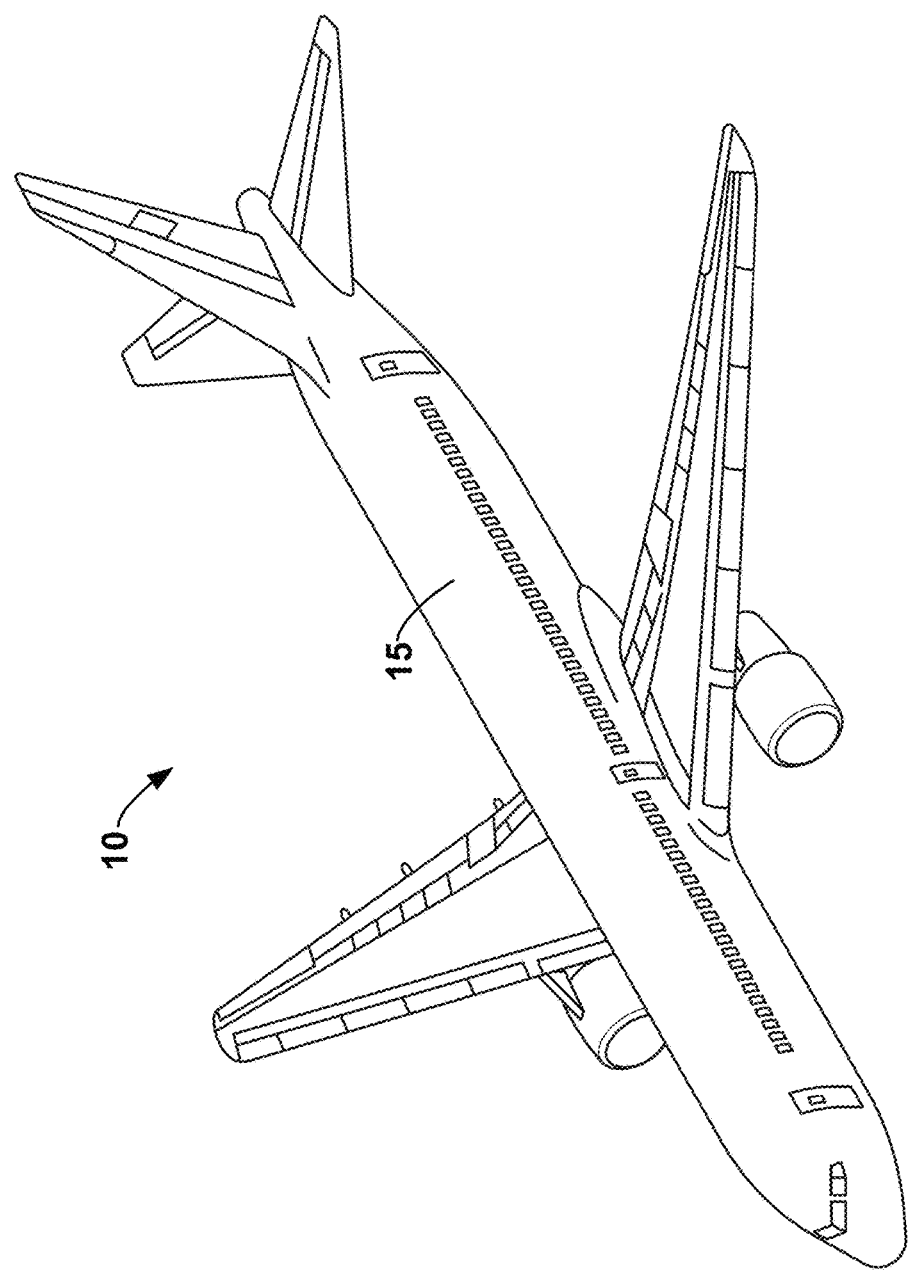
FIG. 1 is a perspective view of an aircraft, according to an example.

FIG. 1 is a perspective view of an aircraft 10. The aircraft 10 is shown as a commercial airliner, but the aircraft 10 could take other forms as well. The aircraft 10 includes a fuselage 15.

Figure 2:
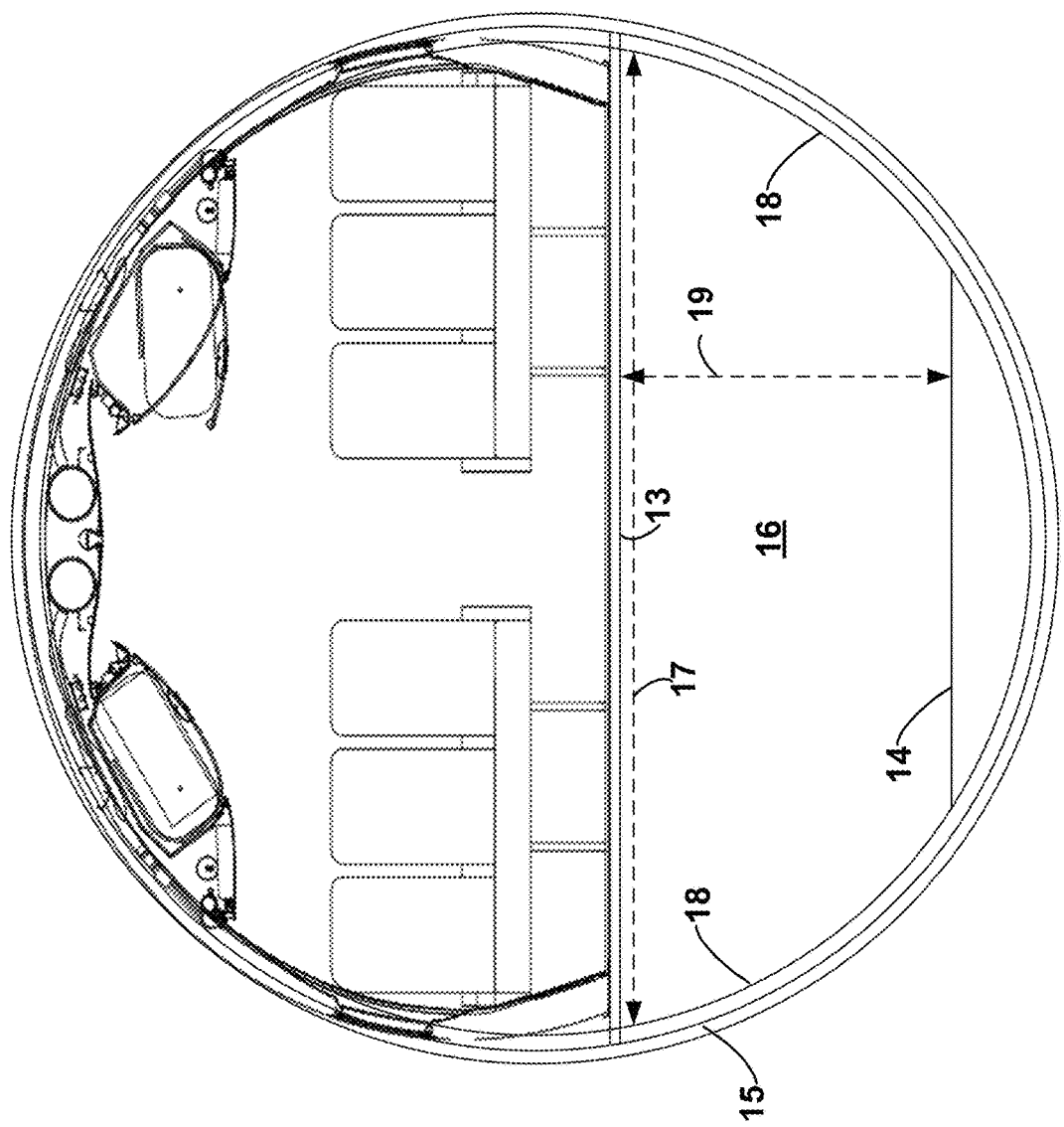
FIG. 2 is a cross sectional view of an aircraft, according to an example.

FIG. 2 is a cross sectional view of the aircraft 10, more specifically, the fuselage 15. The aircraft 10 includes the fuselage 15 and a cargo container area 16 extending through the fuselage 15. The cargo container area 16 is defined by a cargo support surface 14 (e.g., a floor surface), a cargo area ceiling 13, and opposing sidewalls 18 extending from the cargo support surface 14 and extending from the cargo area ceiling 13.

The cargo container area 16 has an upper length 17 of approximately 120 inches (e.g., 110-130 inches) along the cargo area ceiling 13 and a height 19 of approximately 42.5 inches (e.g., 35-45 inches). The cargo support surface 14 has an inboard/outboard length of approximately 52 inches (e.g., 45-60 inches).

Figure 3:
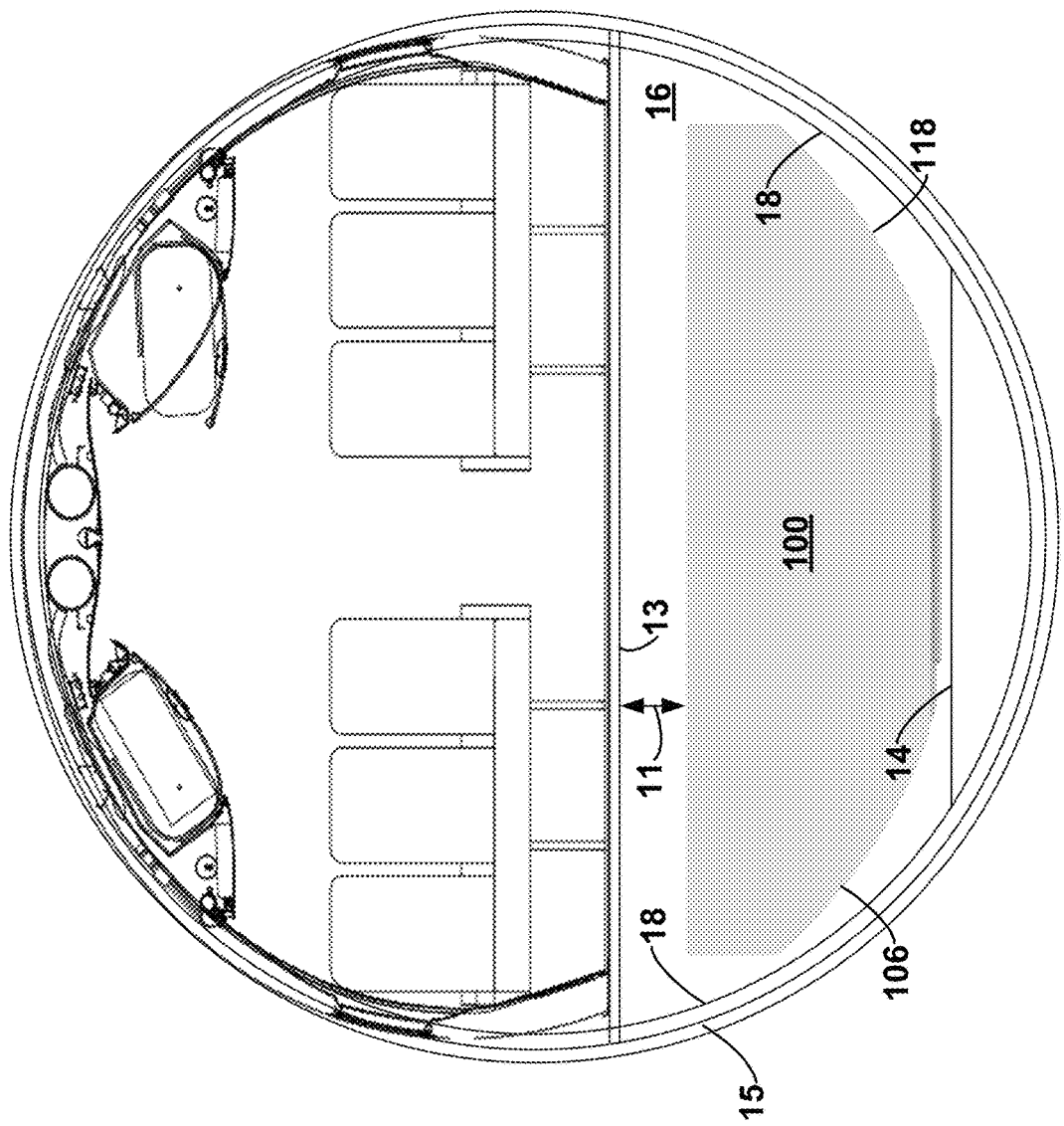
FIG. 3 is a cross sectional view of an aircraft and a cargo container, according to an example.

FIG. 3 is a cross sectional view of the aircraft 10, more specifically, the fuselage 15. FIG. 3 shows a cargo container 100 within the cargo container area 16. The cargo container 100 includes opposing sidewalls (e.g., a sidewall 106 and a sidewall 118) that extend in a direction that corresponds to the opposing sidewalls 18 of the cargo container area 16. That is, the sidewall 106 and the sidewall 118 both have an upward slope in the outboard direction like the opposing sidewalls 18 when the cargo container 100 is positioned as shown in FIG. 3. In other examples, the sidewall 106 and the sidewall 118 have slopes or curves that are substantially equal to the slope or curve of the opposing sidewalls 18. As shown in FIG. 3, the sidewall 106 and the sidewall 118 each form a convex surface and the opposing sidewalls 18 each form a concave surface.

As shown in FIG. 3, the cargo container 100 is sized (e.g., has a suitable height) to form a gap 11 between the cargo area ceiling 13 and a lid (e.g., top surface) of the cargo container 100. This reserves some space within the cargo container area 16 for storing items that are too large for placement within the cargo container 100, further enhancing efficiency.

Figure 4:
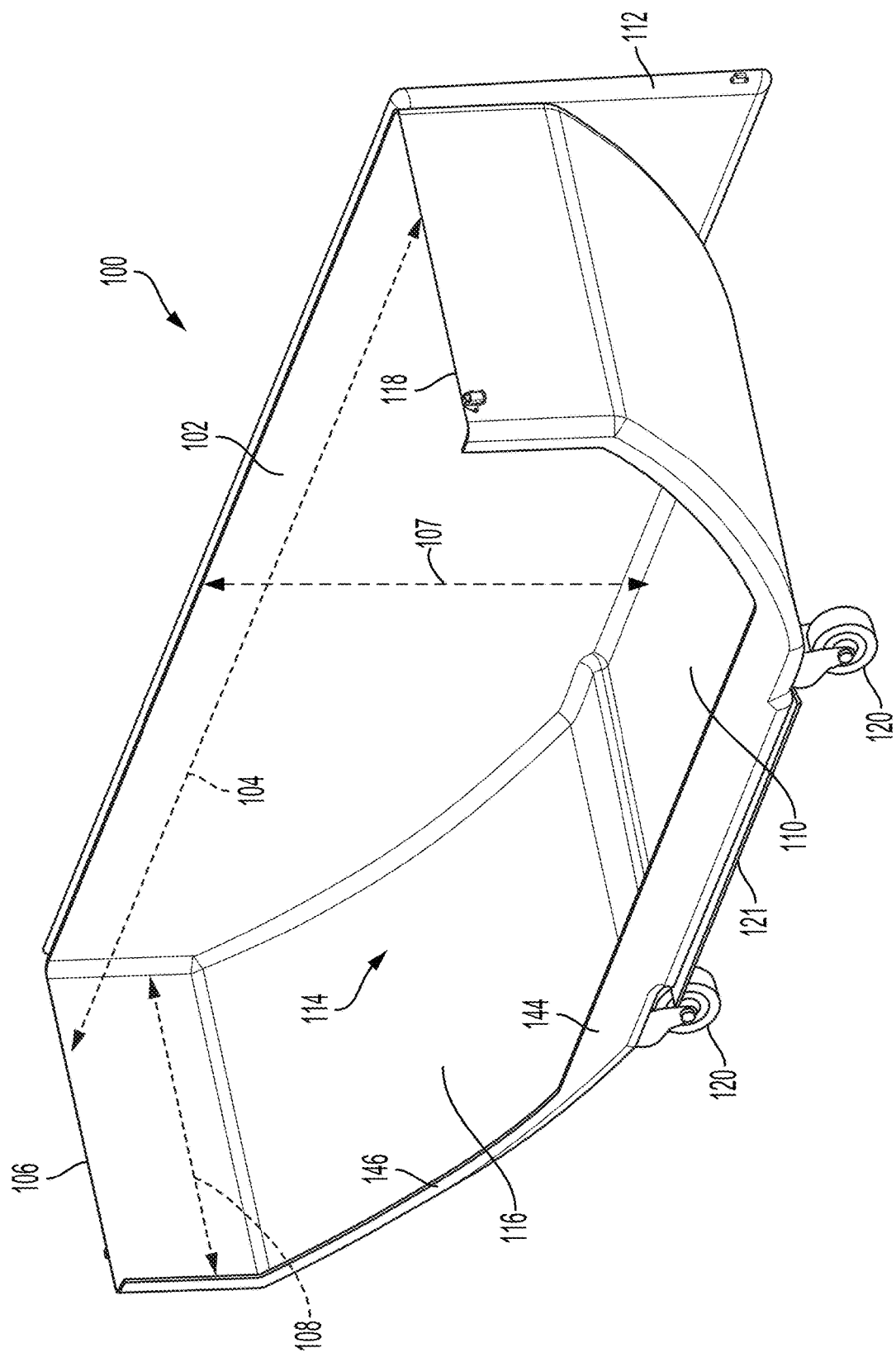
FIG. 4 is a perspective view of a cargo container, according to an example.

FIG. 4 is a perspective view of the cargo container 100. The cargo container 100 includes a first sidewall 102 having a first length 104 of approximately 96 inches (e.g., 85-105 inches) and a second sidewall 106 having a second length 108 of approximately 24 inches (e.g., 20-30 inches) extending transversely from the first sidewall 102. The first length 104 is greater than the second length 108. The cargo container 100 further includes a base sidewall 110 extending from the first sidewall 102 and the second sidewall 106. The base sidewall 110 is configured to support the cargo container 100 on the cargo support surface 14 of the aircraft 10. The cargo container 100 further includes a lid 112 configured to couple (e.g., via a hinge) to the first sidewall 102, the second sidewall 106, or the base sidewall 110 to at least partially cover a cavity 114 formed by the first sidewall 102, the second sidewall 106, and the base sidewall 110. In the example of FIG. 4, the lid 112 is attached to the first sidewall 102. The cargo container 100 has a height 107 of approximately 28 inches (e.g., 25-35 inches).

The cargo container 100 also includes a third sidewall 118 extending from the first sidewall 102 and opposite the second sidewall 106. The second sidewall 106 and the third sidewall 118 together exhibit reflectional symmetry, which can facilitate a good fit with the opposing sidewalls 18 and efficient use of the cargo container area 16. The third sidewall 118 can include any or all features of the second sidewall 106.

The second sidewall 106 comprises a panel portion 116 that extends (e.g., curves) in a direction that corresponds to the sidewalls 18 of the cargo container area 16 of the aircraft 10. For example, the panel portion 116 is curved in a way that resembles the curve of the sidewalls 18 of the cargo container area 16. In this way, the second sidewall 106 transitions from being perpendicular to the base sidewall 110 at the top of the second sidewall 106 to being parallel with the base sidewall 110 at the bottom of the second sidewall 106. In this way, the shape of the panel portion 116 (e.g., the second sidewall 106 and/or the third sidewall 118) can facilitate efficient cargo loading within the cargo container area 16.

The first sidewall 102, the second sidewall 106, the third sidewall 118, and the base sidewall 110 are formed of a unitary body (e.g., via a rotational molding process). The first sidewall 102, the second sidewall 106, the third sidewall 118, and the base sidewall 110 are generally formed of plastic and/or a low friction material such as polytetrafluoroethylene (PTFE) and/or ultra-high-molecular-weight polyethylene (UHMW), but other materials are possible. The base sidewall 110 including PTFE can help provide a surface upon which the cargo container 100 can be slid easily. The first sidewall 102, the second sidewall 106, the third sidewall 118, and the base sidewall 110 being formed of a unitary plastic body can result in the cargo container 100 being lightweight yet strong. In some examples, the base sidewall 110 is equal in length, parallel to the first sidewall 102, to the length of the cargo support surface 14 of the aircraft 10 in the inboard/outboard direction. In some examples, the first sidewall 102, the second sidewall 106, the third sidewall 118, and/or the base sidewall 110 include stiffening ribs formed via rotational molding process.

The cargo container 100 also includes a plurality of wheels 120 that extend from the base sidewall 110 and are configured for supporting and rolling the cargo container 100, for example, on the cargo support surface 14 or on a ramp that connects a tarmac to the cargo support surface 14.

The cargo container 100 also includes a base plate 121 fastened to the base sidewall 110. In examples in which the wheels 120 are not included, the cargo container 100 can be slid along the base plate 121. For example, the base plate 121 could be formed of a low-friction or friction reducing material such as polytetrafluoroethylene (PTFE).

The cargo container 100 includes a first lip portion 144 that is substantially parallel to the first sidewall 102 and that extends from the base sidewall 110. The cargo container 100 also includes a second lip portion 146 that is substantially parallel to the first sidewall 102 and extends from the second sidewall 106. The first lip portion 144 and the second lip portion 146 can help prevent cargo items from falling horizontally out of the cavity 114 during loading of the cargo container 100.

Figure 5:
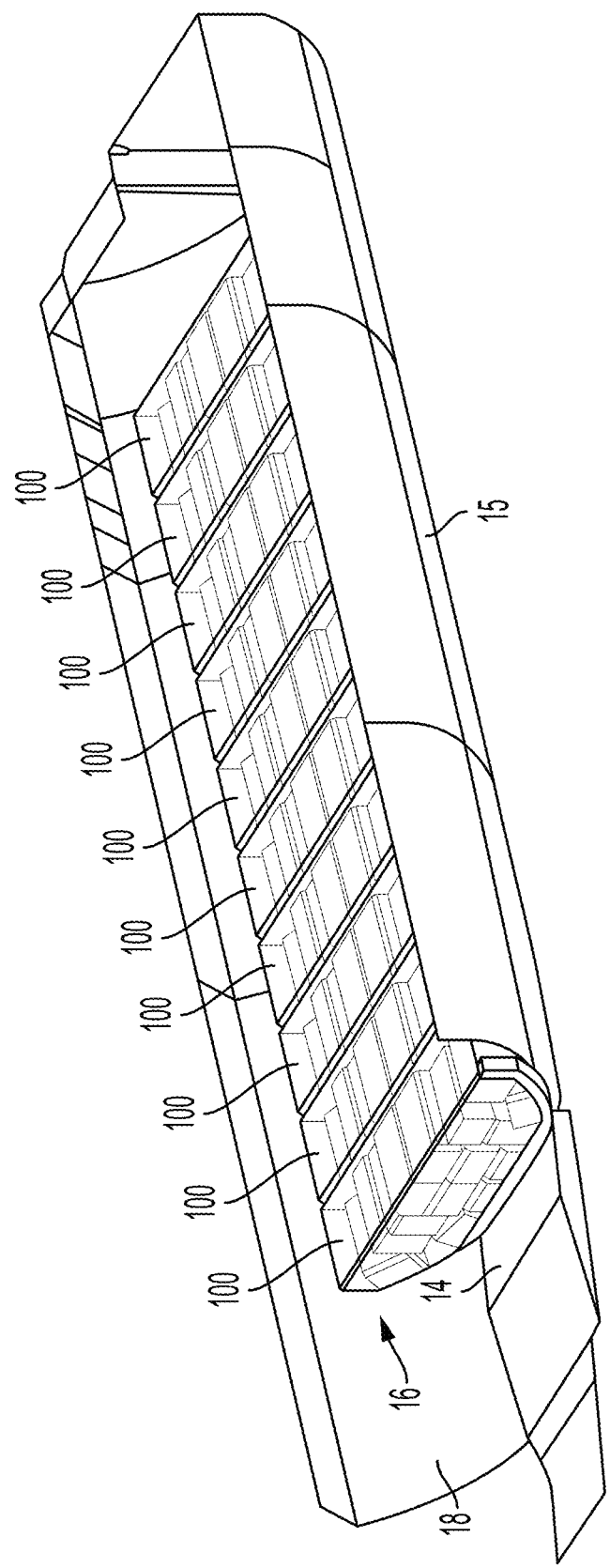
FIG. 5 is a cut away view of a fuselage and cargo containers, according to an example.

The first length 104 being greater than the second length 108 (e.g., at least four times greater) helps the cargo container 100 facilitate more efficient and more ergonomic loading of cargo into the aircraft 10, as shown in FIG. 5.

FIG. 5 is a cut away view of the fuselage 15. As shown, the fuselage 15 (e.g., the cargo container area 16) contains several of the cargo containers 100. The cargo containers 100 contain many items of luggage as shown. In an example, the first length 104 is chosen such that the second sidewalls 106 and the third sidewalls 118 of the cargo containers 100 conform to the sidewalls 18 to some degree. The second length 108 can be slightly greater than a standardized height of a typical item of luggage so that luggage can be efficiently stacked within the cargo containers 100. The second length 108 will also generally be small enough so that the cargo container 100 is easily loaded through a cargo door of the aircraft 10. The cargo containers 100 being sized in the inboard-outboard direction to somewhat conform to the sidewalls 18 can increase the amount of cargo that can be carried within the cargo container area 16.

Figure 6:
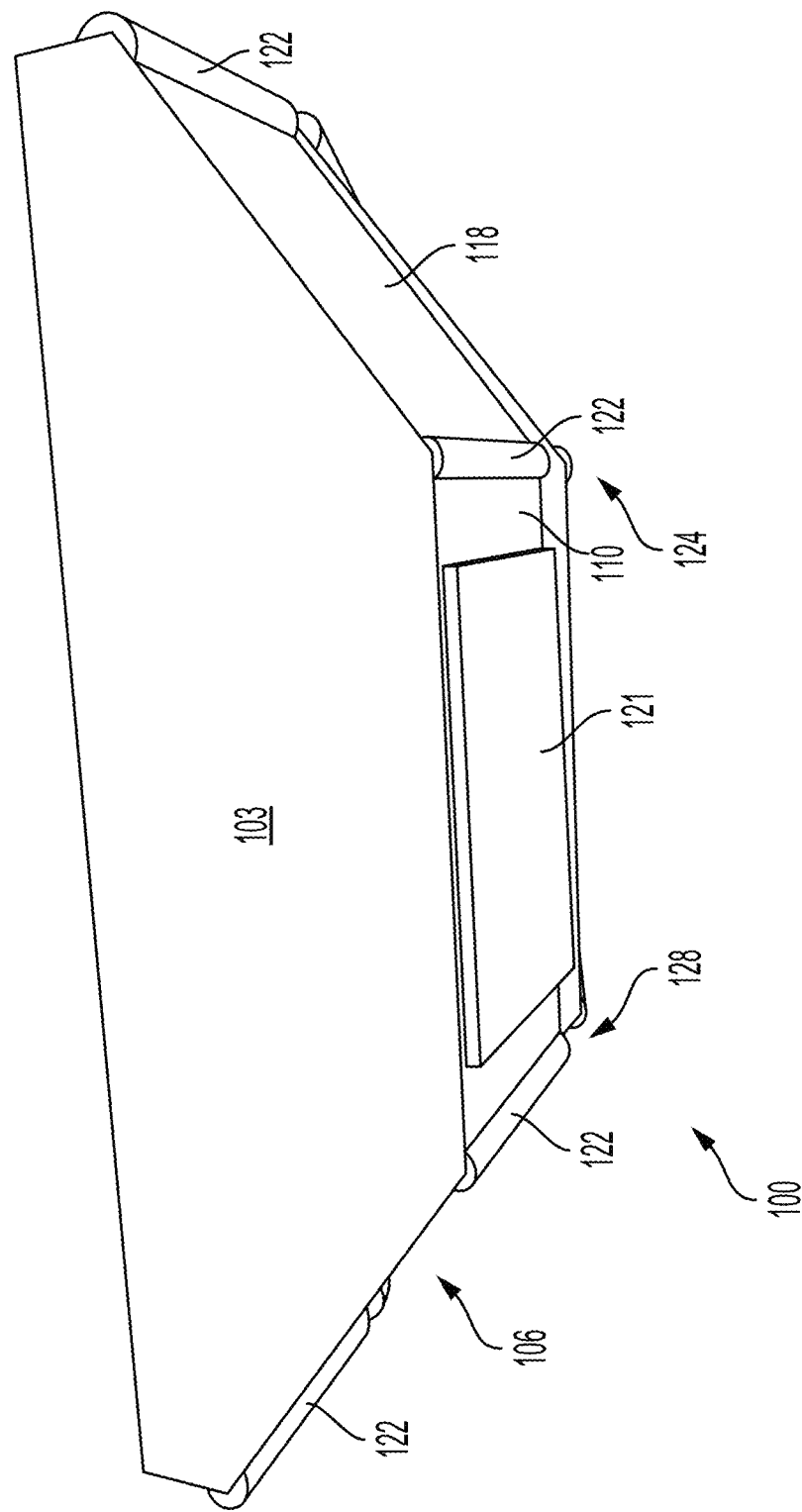
FIG. 6 is a perspective view of a cargo container, according to an example.

FIG. 6 is a perspective view of the cargo container 100. In FIG. 6, the cargo container 100 includes a second sidewall 106 and a third sidewall 118 that are not curved, in contrast to the cargo container 100 shown in FIG. 4. However, any features of the cargo container 100 shown in FIG. 4 can be combined with the features of the cargo container 100 shown in FIG. 6, and vice versa.

In FIG. 6, the cargo container 100 includes a first rub strip 122 comprising a low friction or friction reducing material (e.g., PTFE) on a first side 124 of the base plate 121 and a second rub strip 122 comprising the low friction or friction reducing material on a second side 128 of the base plate 121 that is opposite the first side 124. The first rub strip 122 and the second rub strip 122 can facilitate sliding the cargo container 100 over the cargo support surface 14. Additional rub strips 122 comprising the low friction or friction reducing material on opposite sides near the lid 112 can help move the cargo container 100 against the sidewalls 18 of the cargo container area 16.

In FIG. 6, the first sidewall 102 (not shown), the second sidewall 106 (not shown), the third sidewall 118, a fourth sidewall 103, and/or the base sidewall 110 are honeycomb composite panels joined together mechanically with fasteners and/or tab and slot connections.

Figure 7:
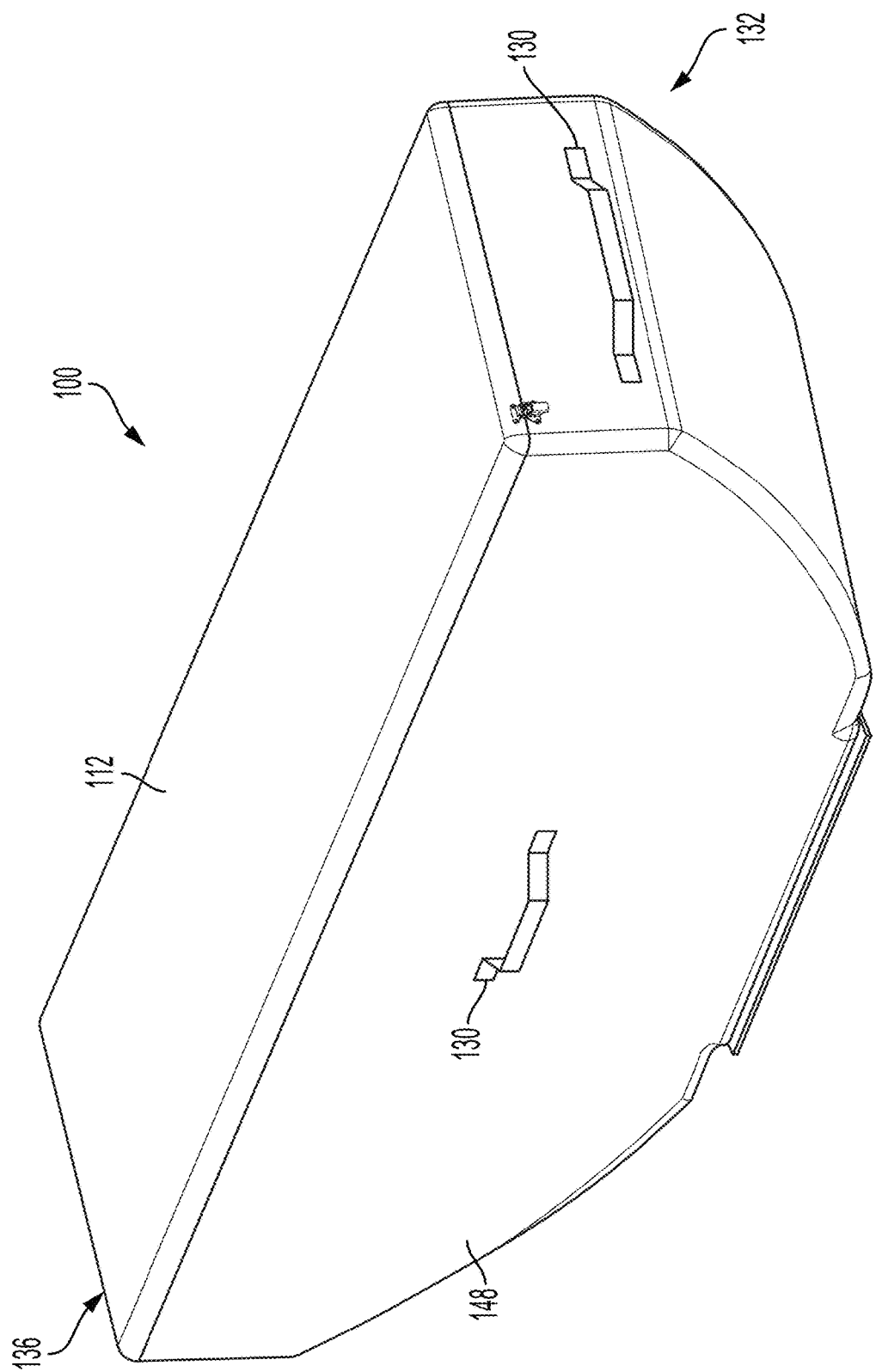
FIG. 7 is a perspective view of a cargo container, according to an example.

FIG. 7 is a perspective view of the cargo container 100. The cargo container 100 further includes a flexible cover 148 (e.g., made of canvas) configured to be fastened (e.g., via snap fittings) to the first lip portion 144 and the second lip portion 146 to at least partially cover the cavity 114. The flexible cover 148 being removable and lightweight can help make loading the cargo container 100 easier by providing a large opening through which to place cargo in the cavity 114 and by providing a quick means for closing the cargo container 100 after loading. The flexible cover 148 and the lid 112 together are configured to completely cover the cavity 114. In some examples, such as the examples shown in FIGS. 13-30, the flexible cover 148 is replaced by a fourth sidewall 103 opposite the first sidewall 102. The fourth sidewall 103 can have any of the characteristics of the first sidewall 102.

The cargo container 100 also includes a first flexible handle 130 on a first end 132 of the cargo container 100 and a second flexible handle 130 on a second end 136 of the cargo container 100 that is opposite the first end 132. This is shown in more detail in FIG. 8.

Figure 8:
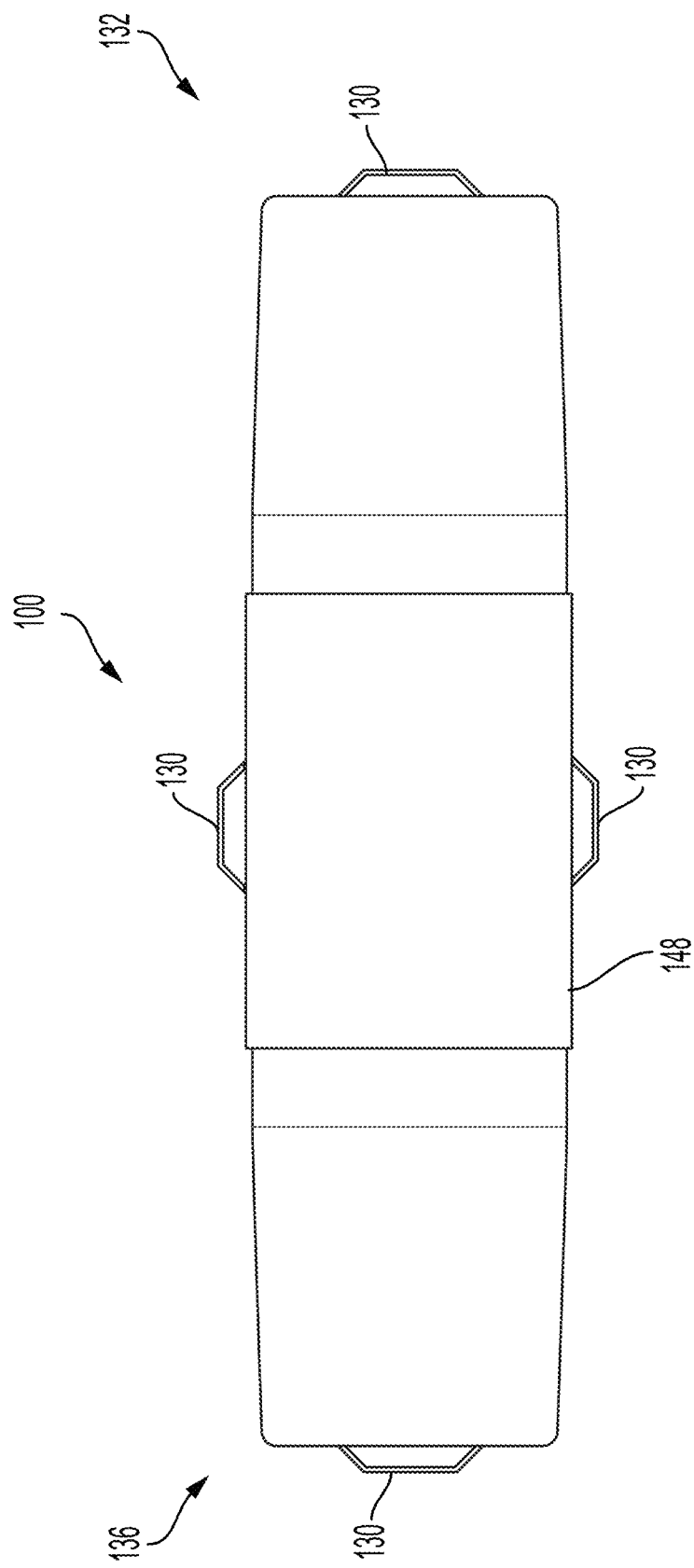
FIG. 8 is a bottom view of a cargo container, according to an example.

FIG. 8 is a bottom view of the cargo container 100. The cargo container 100 includes the first flexible handle 130 on the first end 132 of the cargo container 100 and the second flexible handle 130 on the second end 136 of the cargo container 100 that is opposite the first end 132. The cargo container also includes additional flexible handles 130 as shown.

Figure 9:
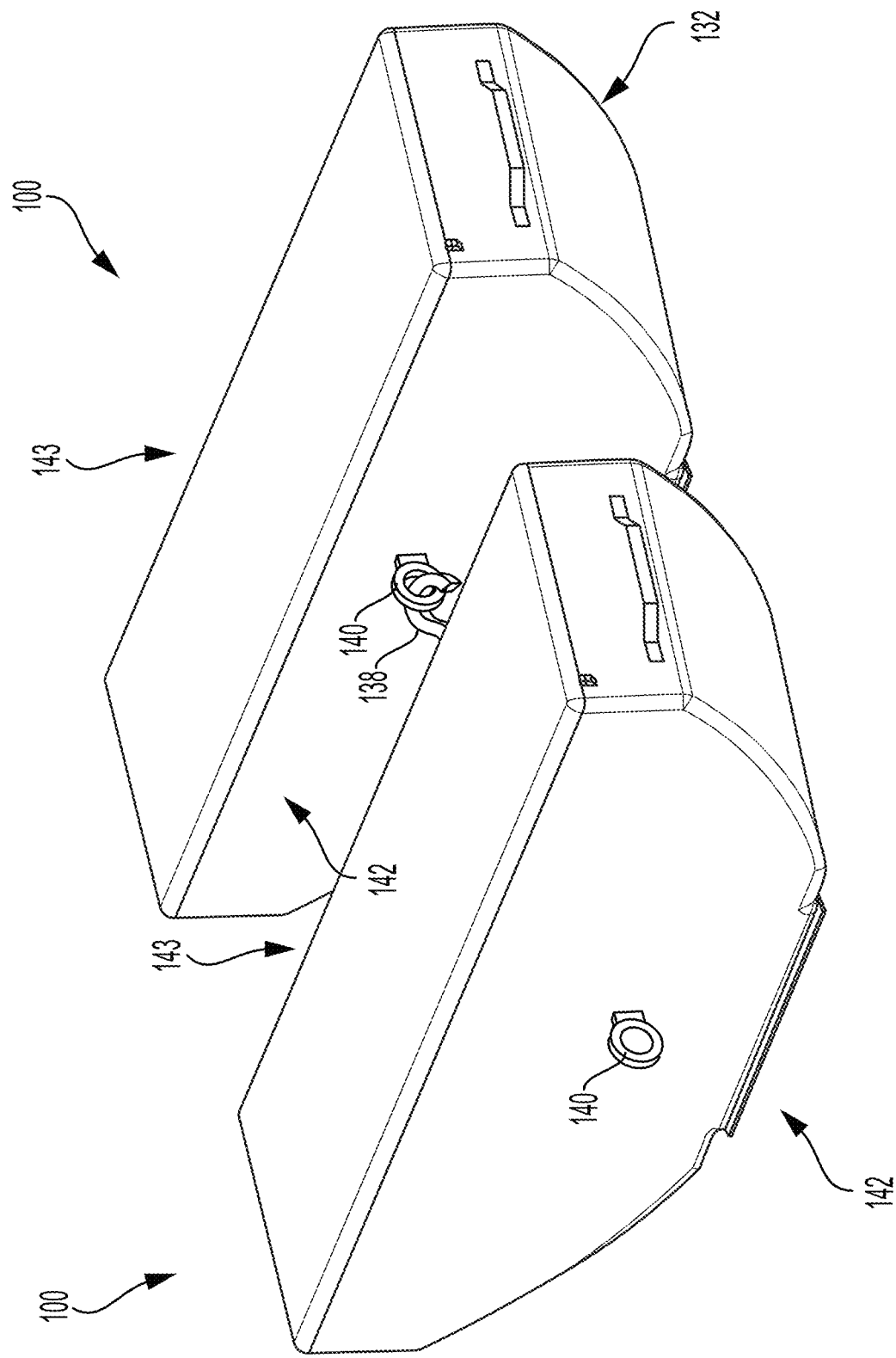
FIG. 9 is a perspective view of cargo containers, according to an example.

FIG. 9 is a perspective view of two cargo containers 100. Both cargo containers 100 include a first linkage device 138 of a first type (e.g., a hook) that is coupled to a first side 143 of the cargo container 100 and a second linkage device 140 of a second type (e.g., an eye bolt) that is coupled to a second side 142 of the cargo container 100 that is opposite the first side 143. As shown, the first linkage device 138 is configured to be coupled to the second linkage device 140. More generally, any first linkage device 138 on a first side 143 of any cargo container 100 is configured to couple to any second linkage device 140 of the second type that is on a second side 142 of any other cargo container 100. As such, a first linkage device 138 of a first cargo container can be coupled to a second linkage device 140 of a second cargo container and a second linkage device 140 of the first cargo container can be coupled to a first linkage device 138 of a third cargo container. The linkage devices can aid with the process of loading and unloading the cargo containers 100 into the cargo container area 16.

For the purpose of ease of illustration, the space between the cargo containers 100 facilitated by the linkage devices is exaggerated as well as the size of the linkage devices themselves. Generally, the linkage devices are smaller than shown but serve the purpose of attaching the cargo containers 100 to each other with a small distance separating the cargo containers 100, so as to efficiently pack as much cargo into the cargo container area 16 as possible.

Figure 10:
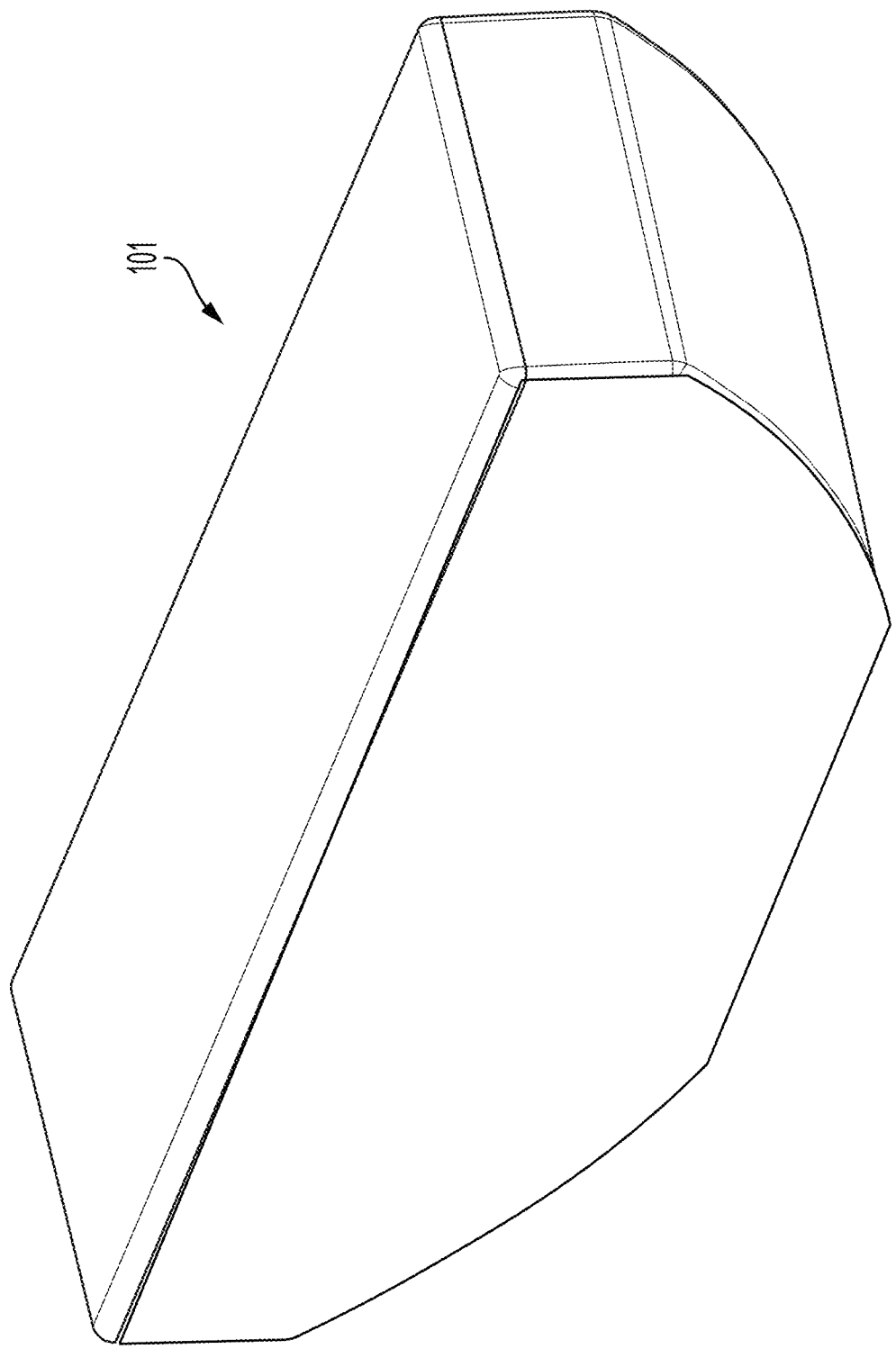
FIG. 10 is a perspective view of a closed container, according to an example.

FIG. 10 is a perspective view of a closed container 101. The closed container 101 is formed via a rotational molding process. For example, a mold that is spinning (e.g., about two perpendicular axes) is filled with molten plastic. The centrifugal forces force the molten plastic against the inner surfaces of the mold and the molten plastic is allowed to cool while spinning to form the closed container 101. The closed container 101 is typically a unitary body of plastic, but other examples are possible.

Figure 11:
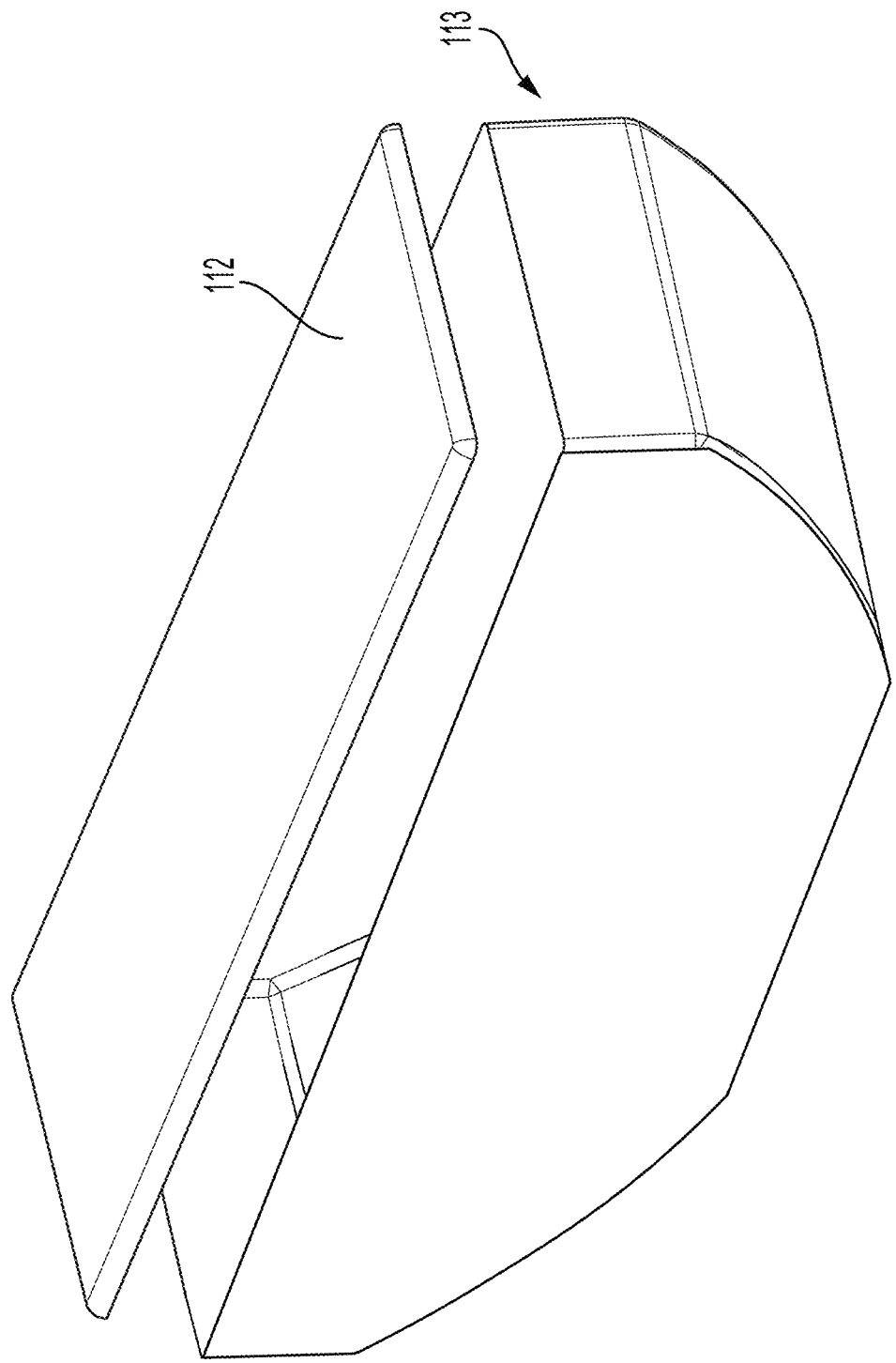
FIG. 11 is a perspective view of an open container and a lid, according to an example.

FIG. 11 is a perspective view of an open container 113 and the lid 112. The lid 112 is produced by removing (e.g., cutting) the lid 112 from the closed container 101 to form the lid 112 and the open container 113. As shown in FIG. 4, the lid 112 can be attached to the open container 113 such that the lid 112 can rotate with respect to the open container 113, thereby forming the cargo container 100.

Figure 12:
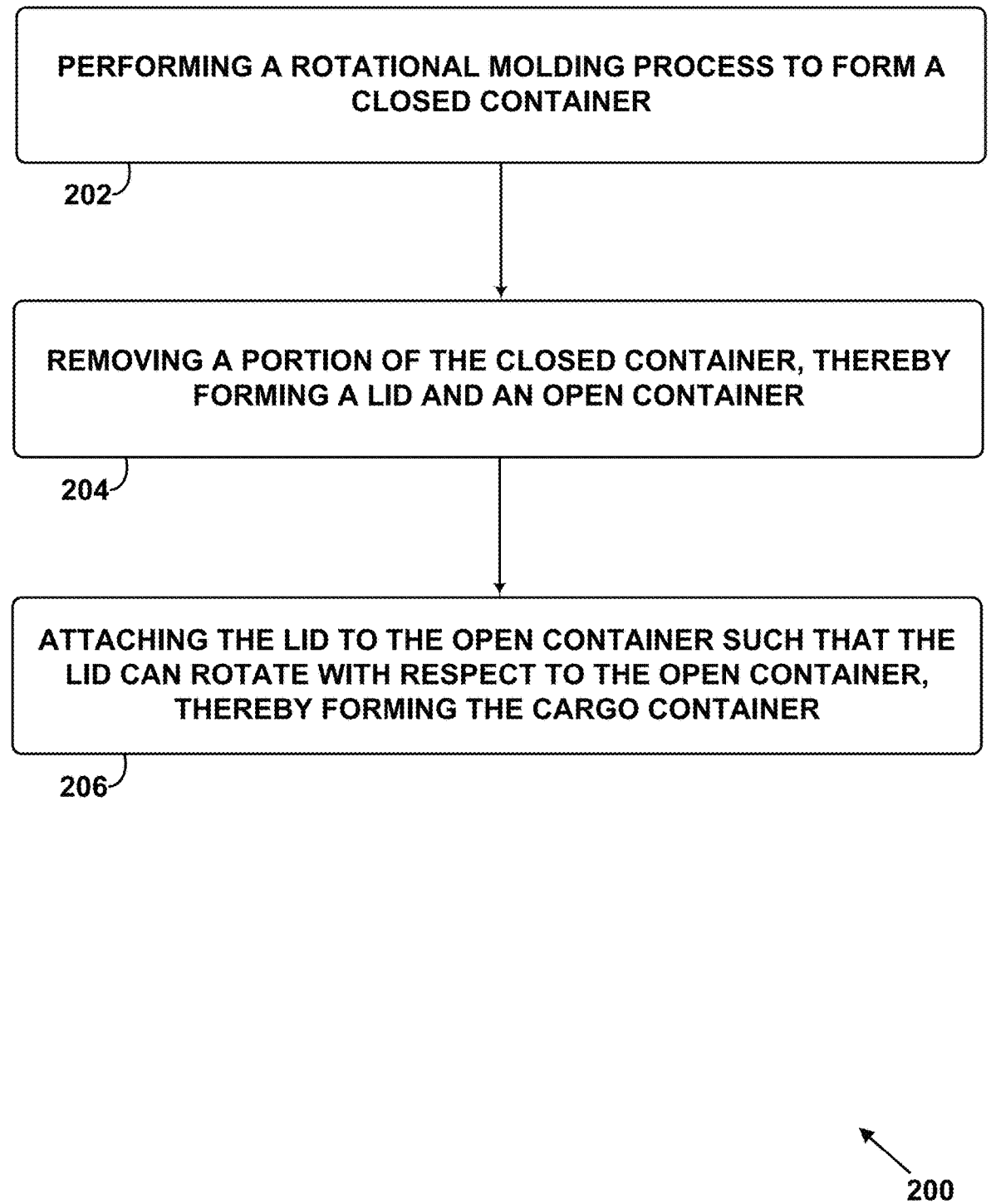
FIG. 12 is a block diagram of a method, according to an example.

FIG. 12 is a block diagram of a method 200 of manufacturing the cargo container 100. As shown in FIG. 12, the method 200 includes one or more operations, functions, or actions as illustrated by blocks 202, 204, and 206. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

Details regarding the blocks 202, 204, and 206 are found above with reference to FIGS. 4, 10, and 11.

At block 202, the method 200 includes performing a rotational molding process to form the closed container 101.

At block 204, the method 200 includes removing a portion of the closed container 101, thereby forming the lid 112 and the open container 113.

At block 206, the method 200 includes attaching the lid 112 to the open container 113 such that the lid 112 can rotate with respect to the open container 113, thereby forming the cargo container 100.

Figure 13:
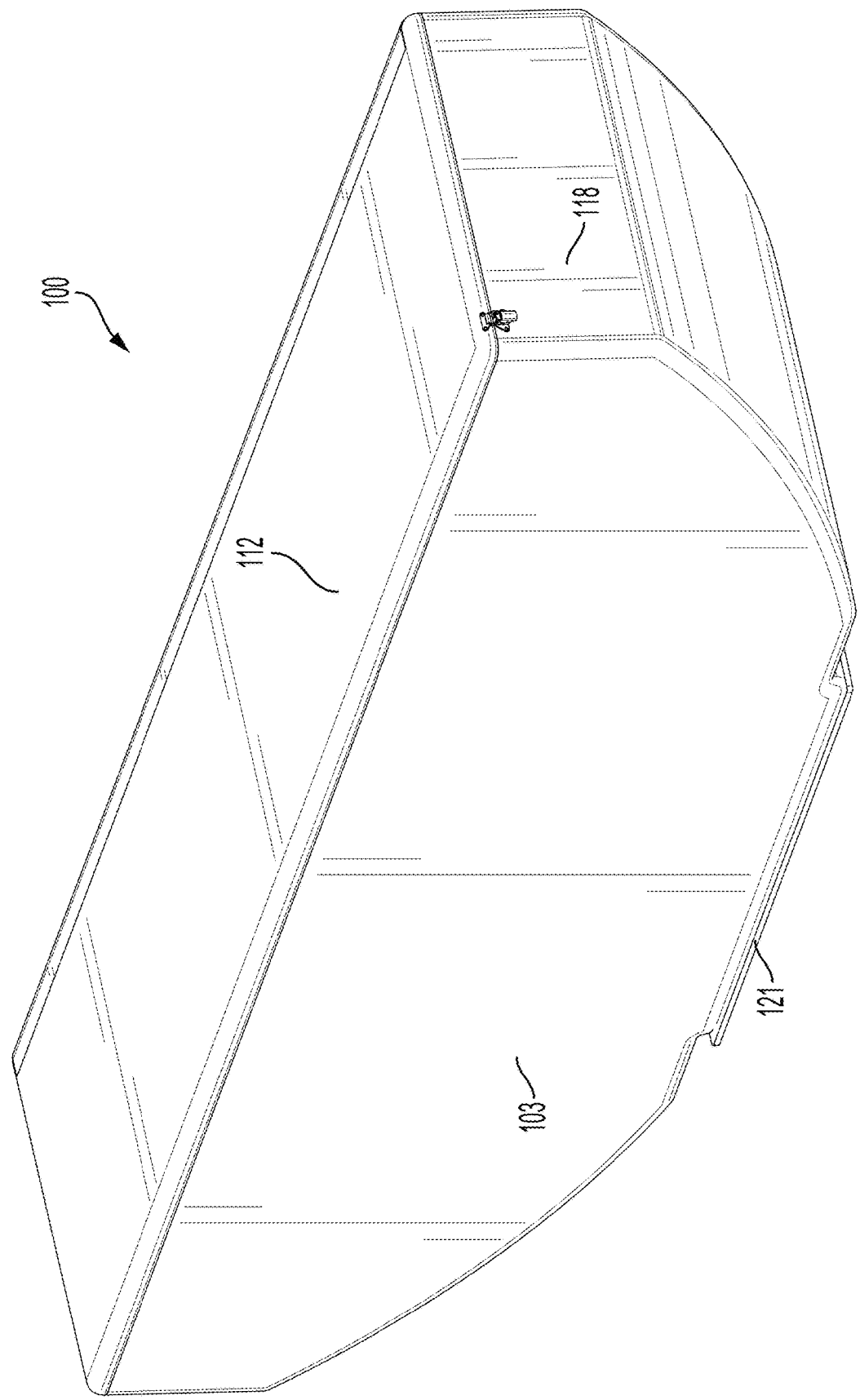
FIG. 13 is a perspective view of a cargo container, according to an example.

FIG. 13 is a perspective view of the cargo container 100. In FIGS. 13-21, the cargo container 100 includes the base plate 121.

Figure 14:
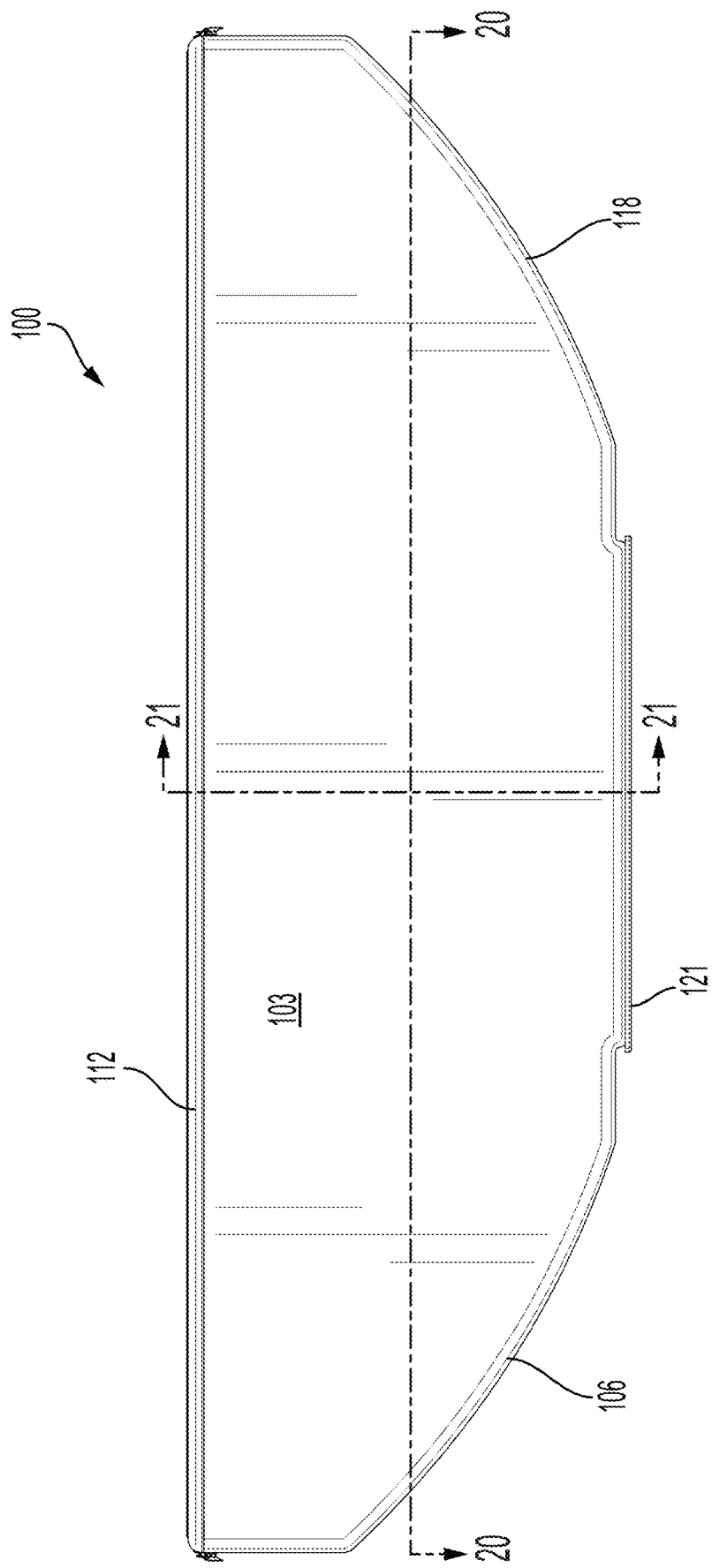
FIG. 14 is a front view of a cargo container, according to an example.
Figure 15:
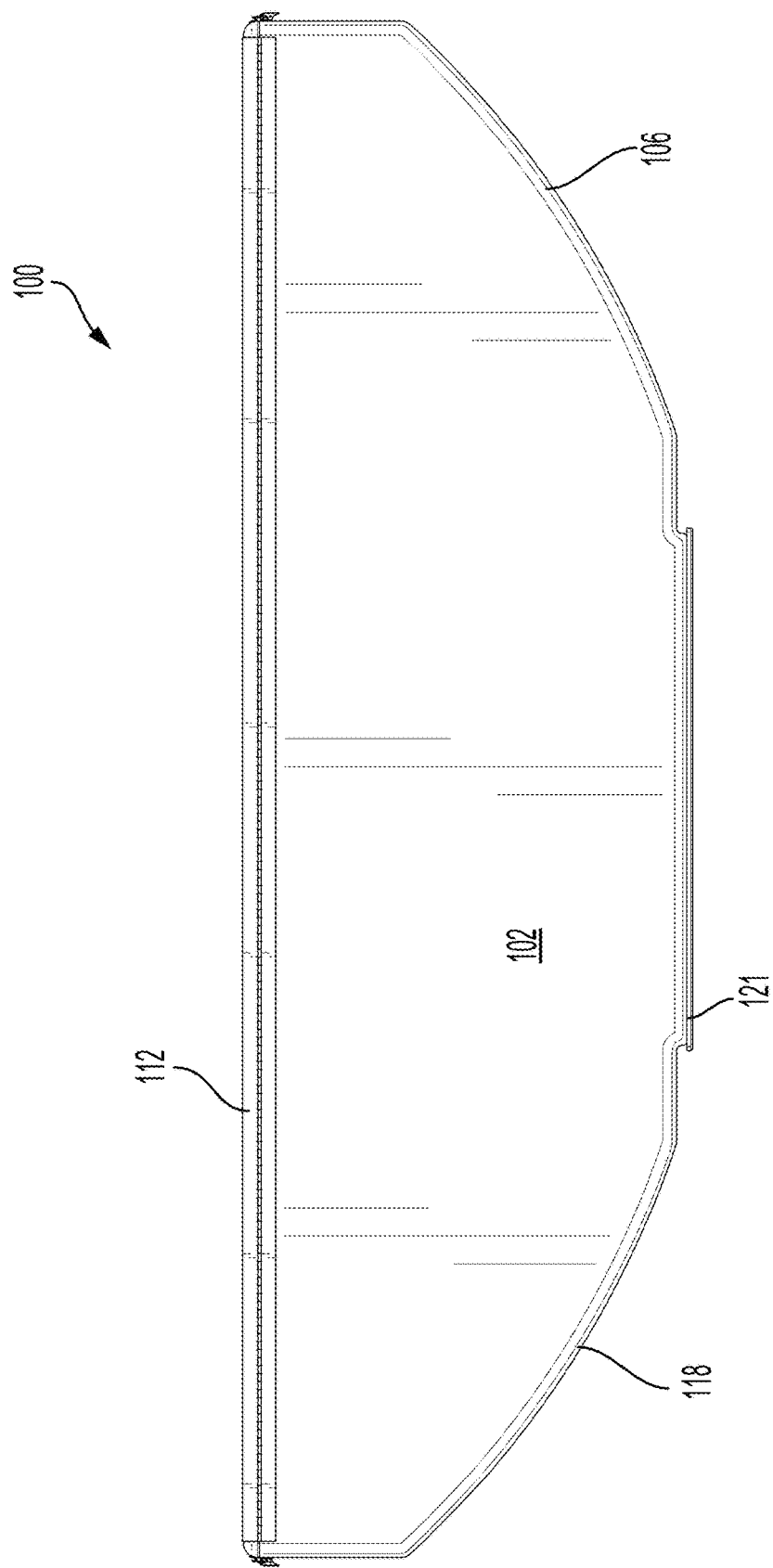
FIG. 15 is a rear view of a cargo container, according to an example.
Figure 16:
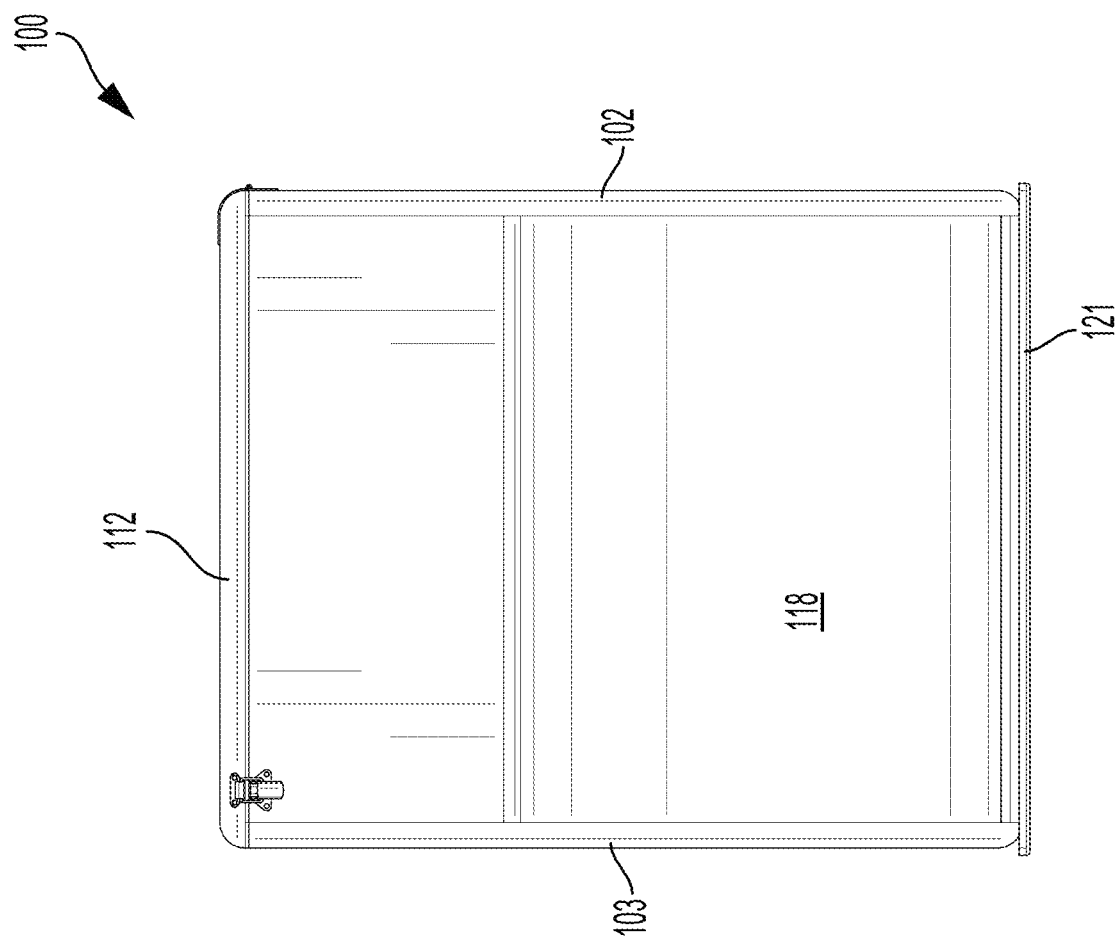
FIG. 16 is a right side view of a cargo container, according to an example.
Figure 17:
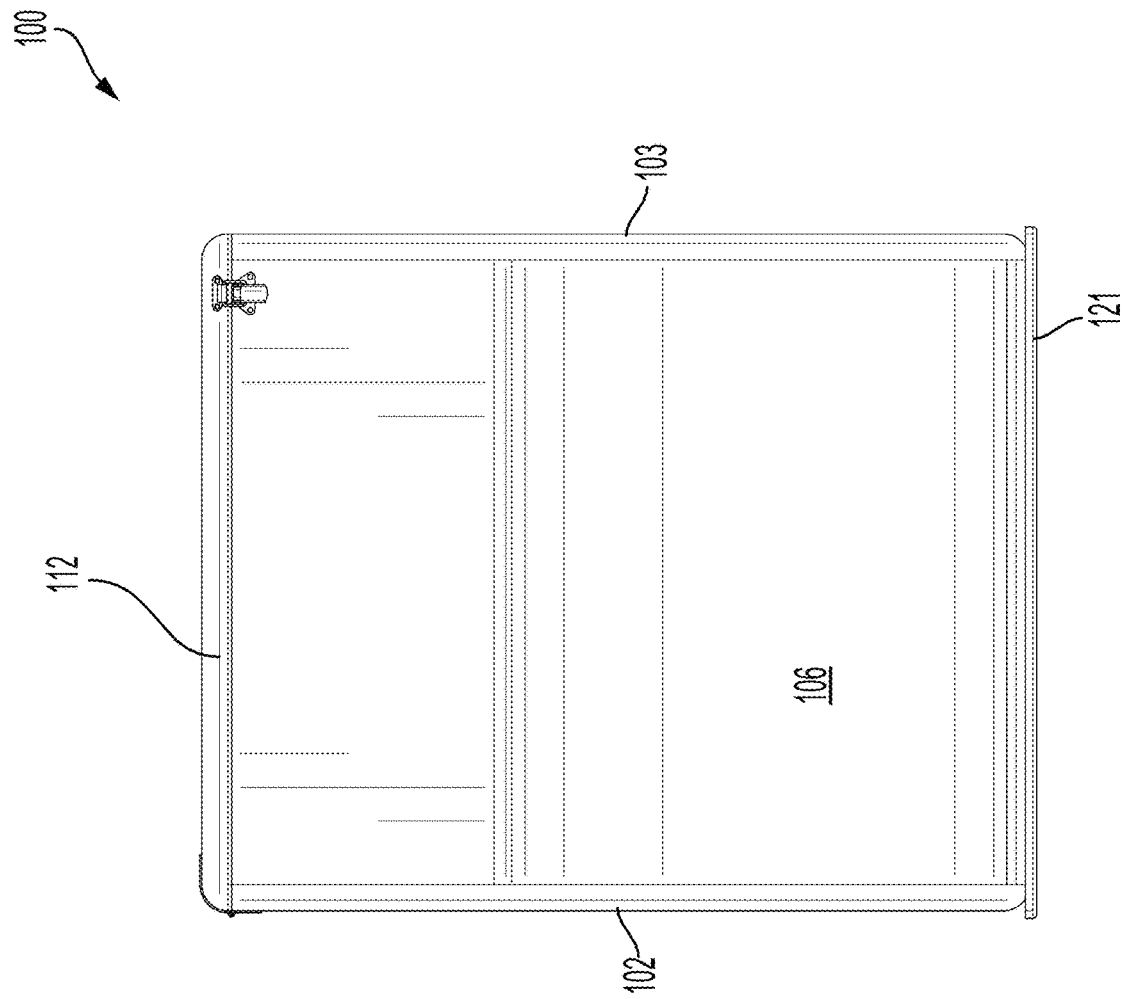
FIG. 17 is a left side view of a cargo container, according to an example.
Figure 18:
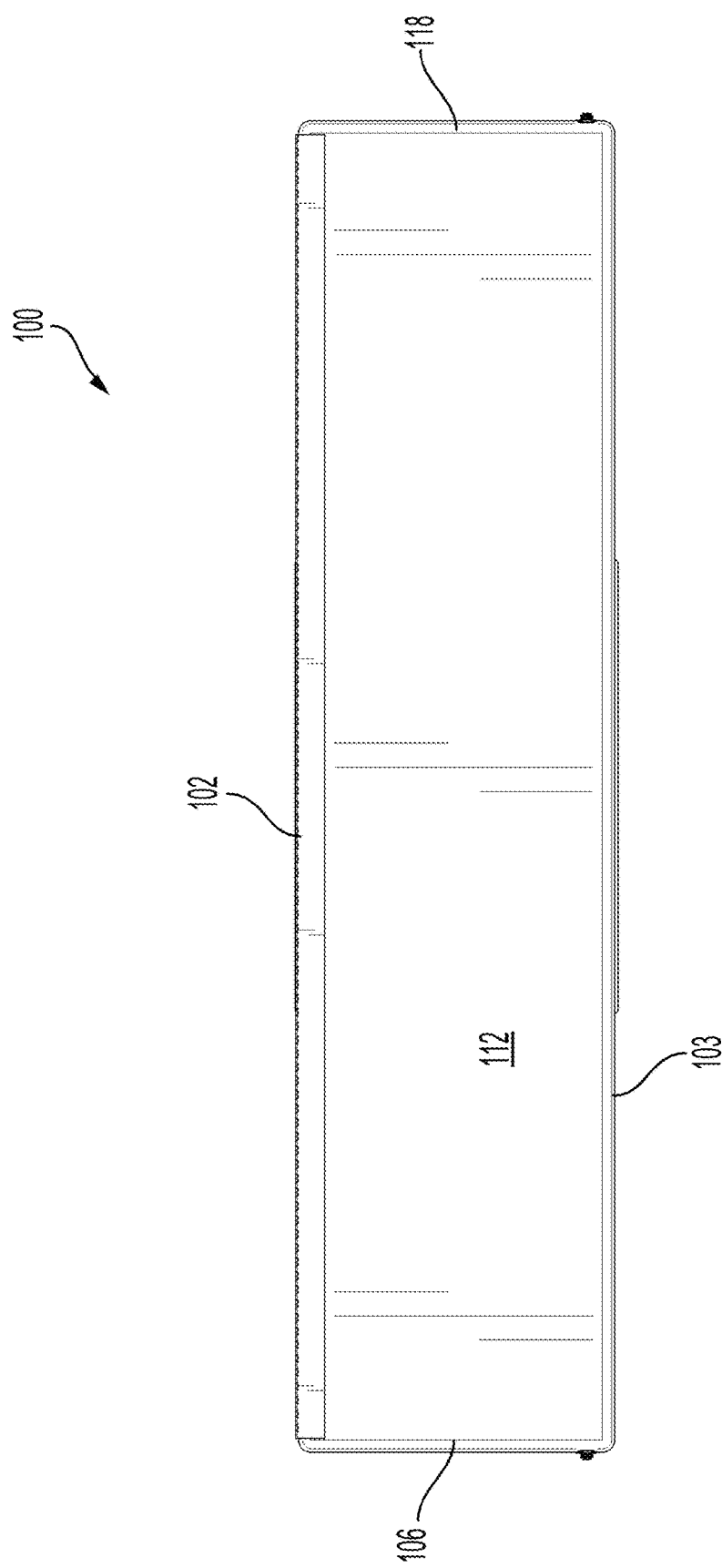
FIG. 18 is a top view of a cargo container, according to an example.
Figure 19:
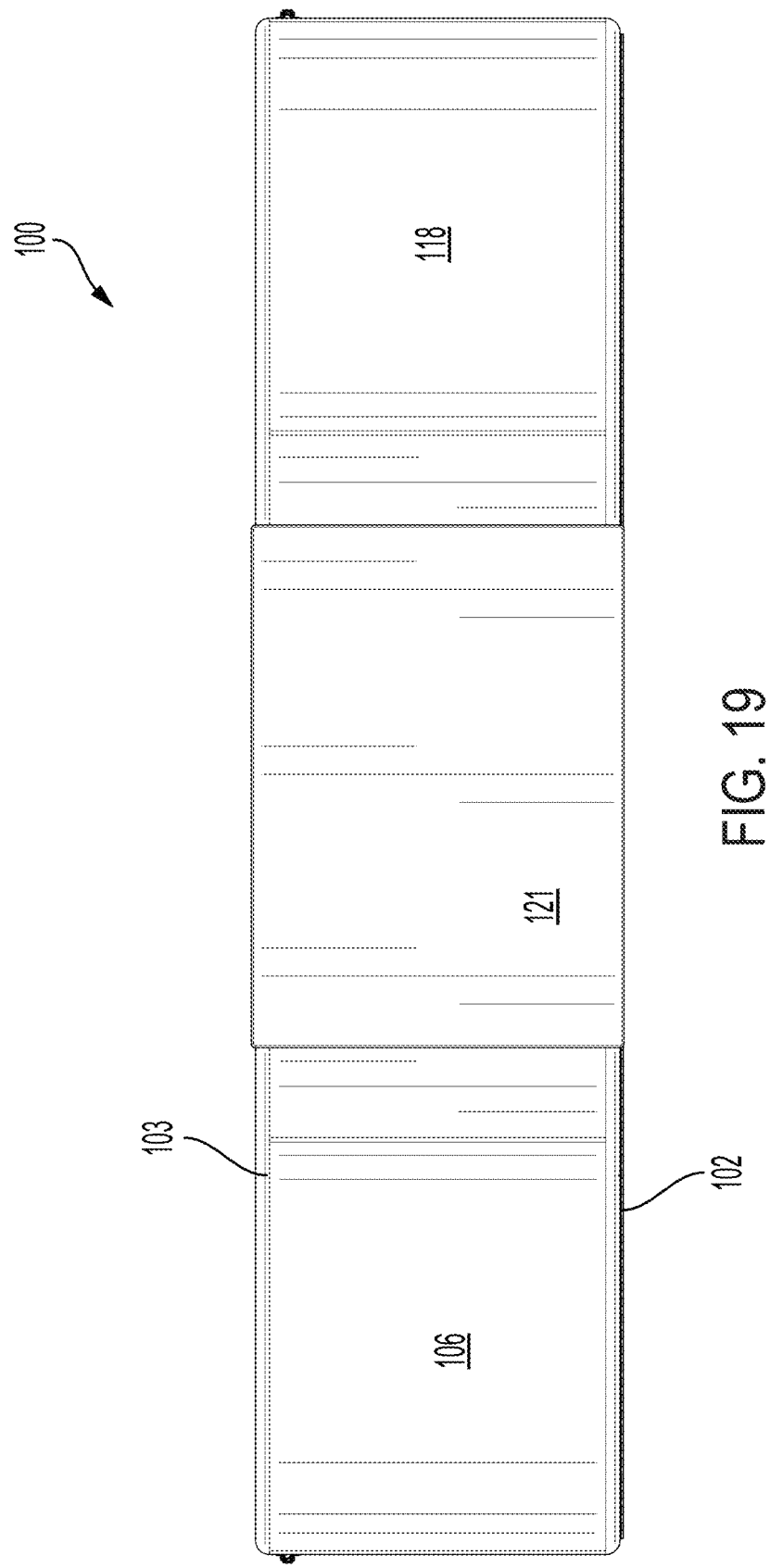
FIG. 19 is a bottom view of a cargo container, according to an example.
Figure 20:
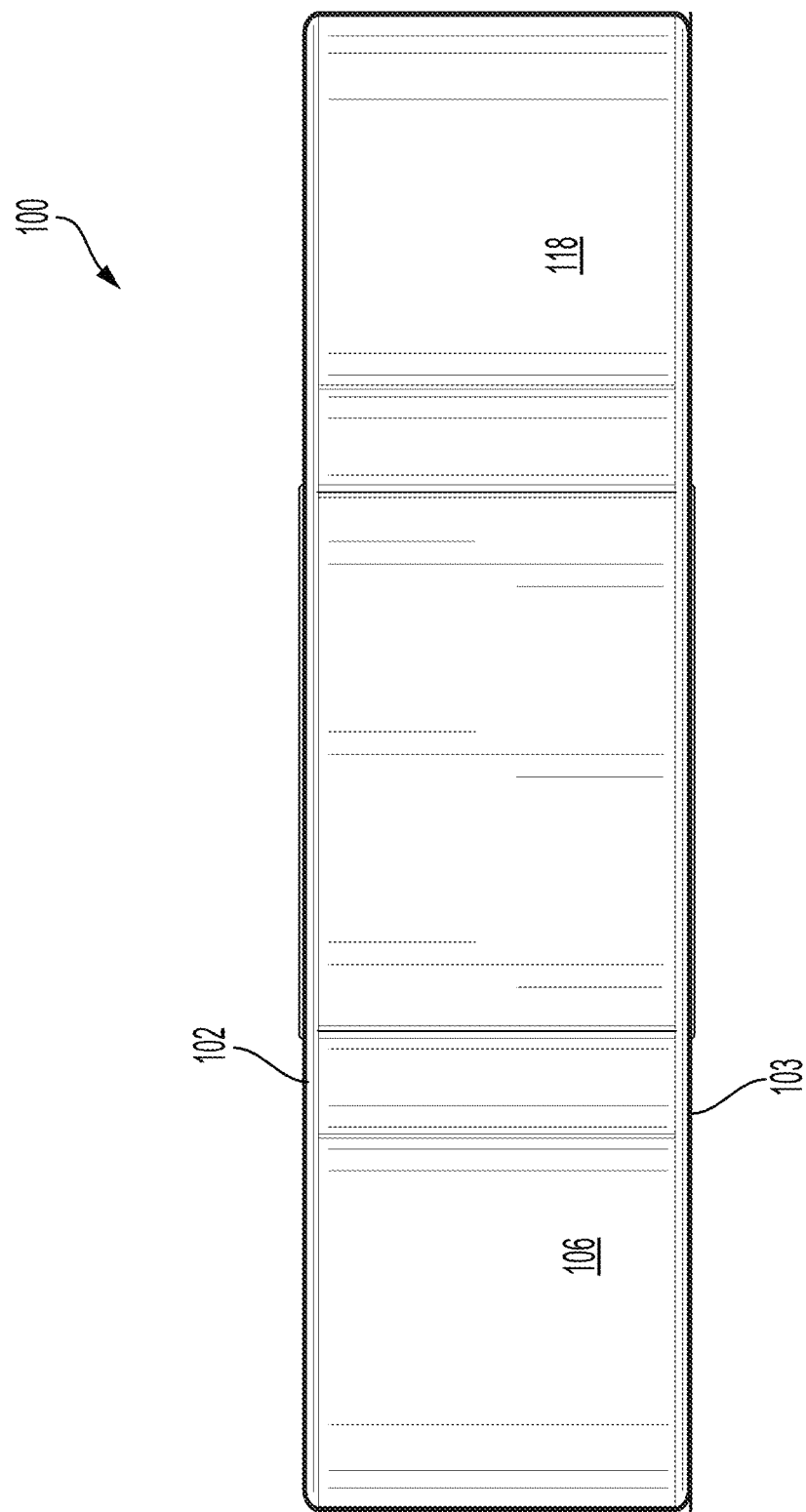
FIG. 20 is a cross sectional view of a cargo container, according to an example.
Figure 21:
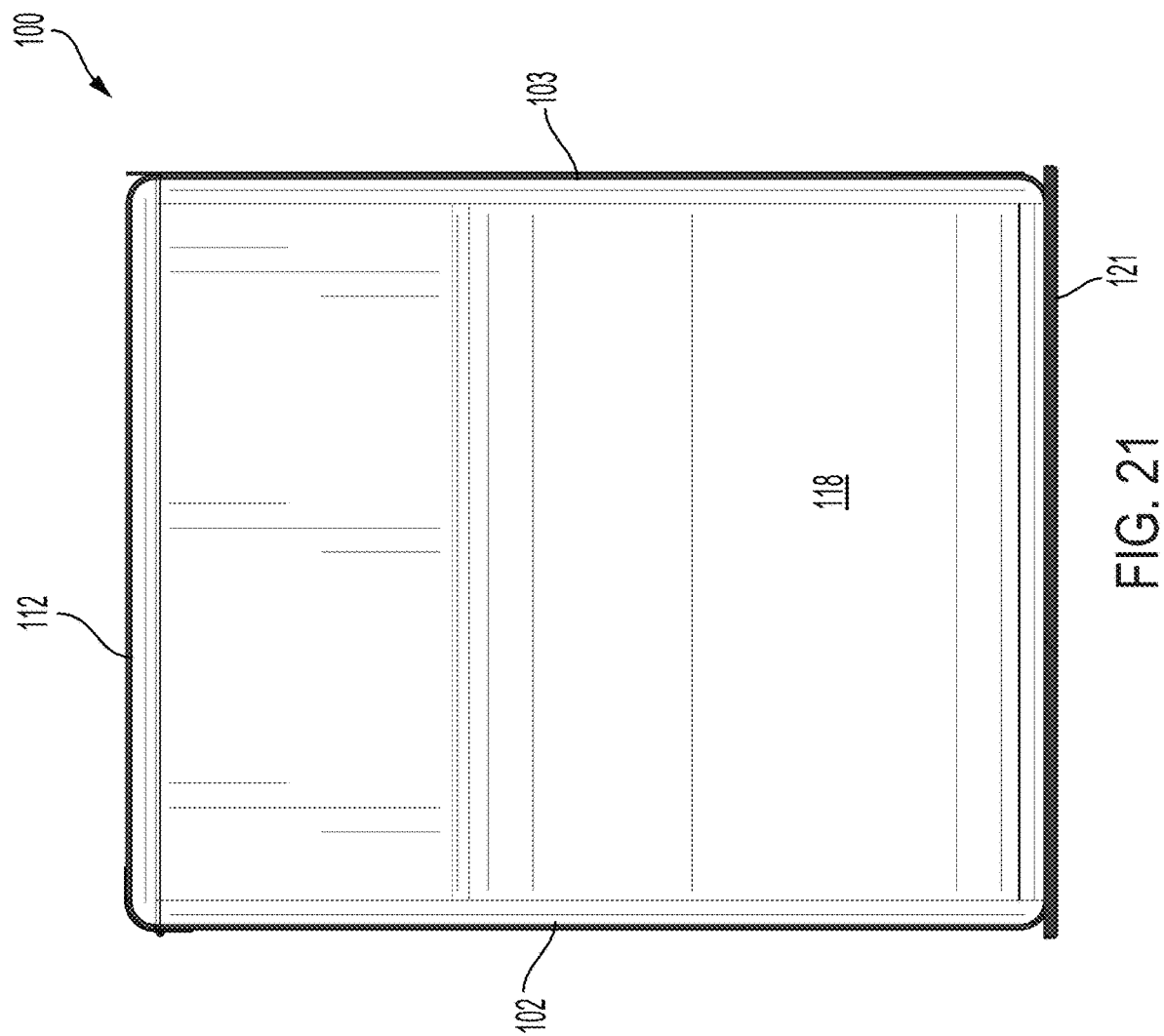
FIG. 21 is a cross sectional view of a cargo container, according to an example.
Figure 22:
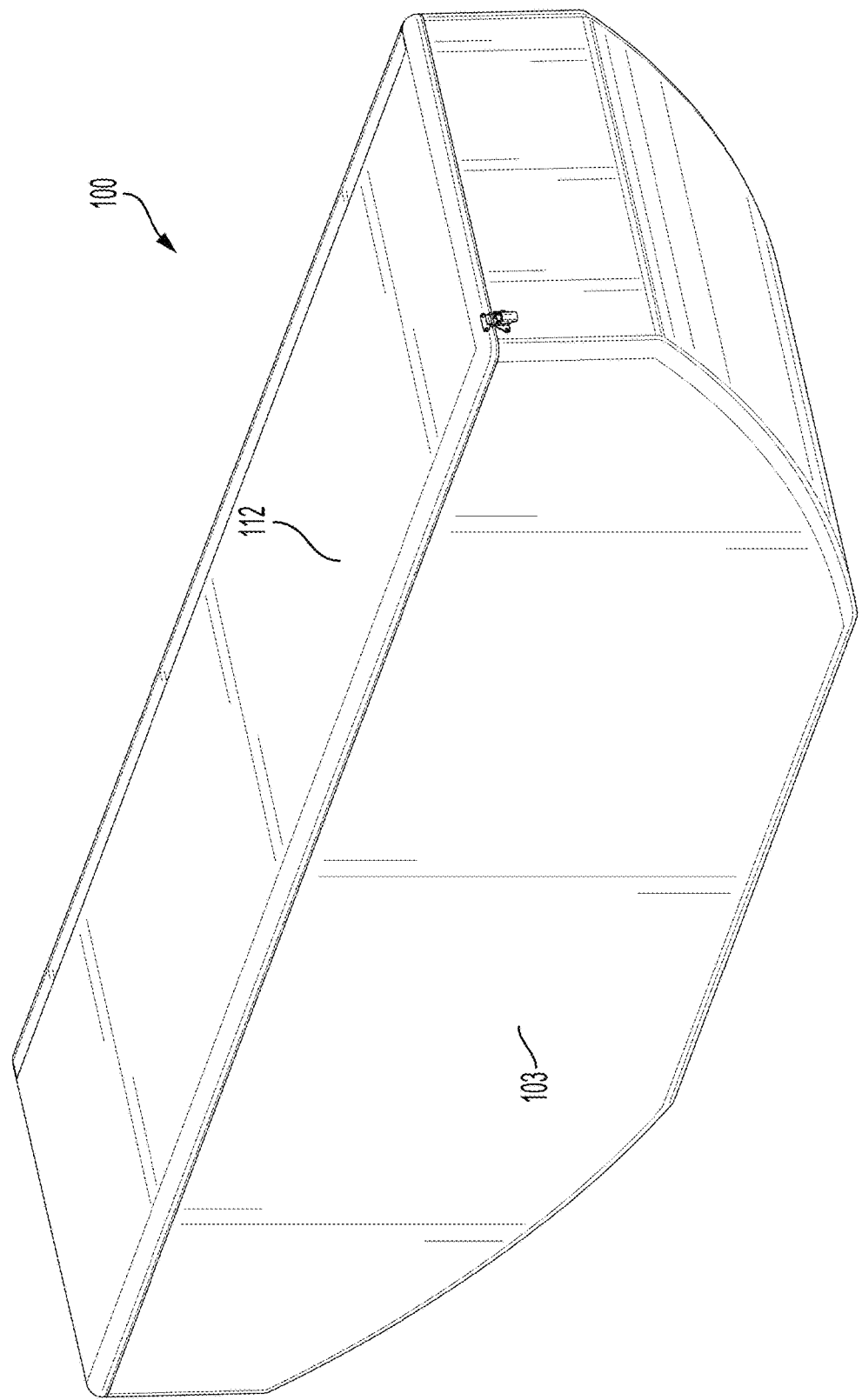
FIG. 22 is a perspective view of a cargo container, according to an example.
Figure 23:
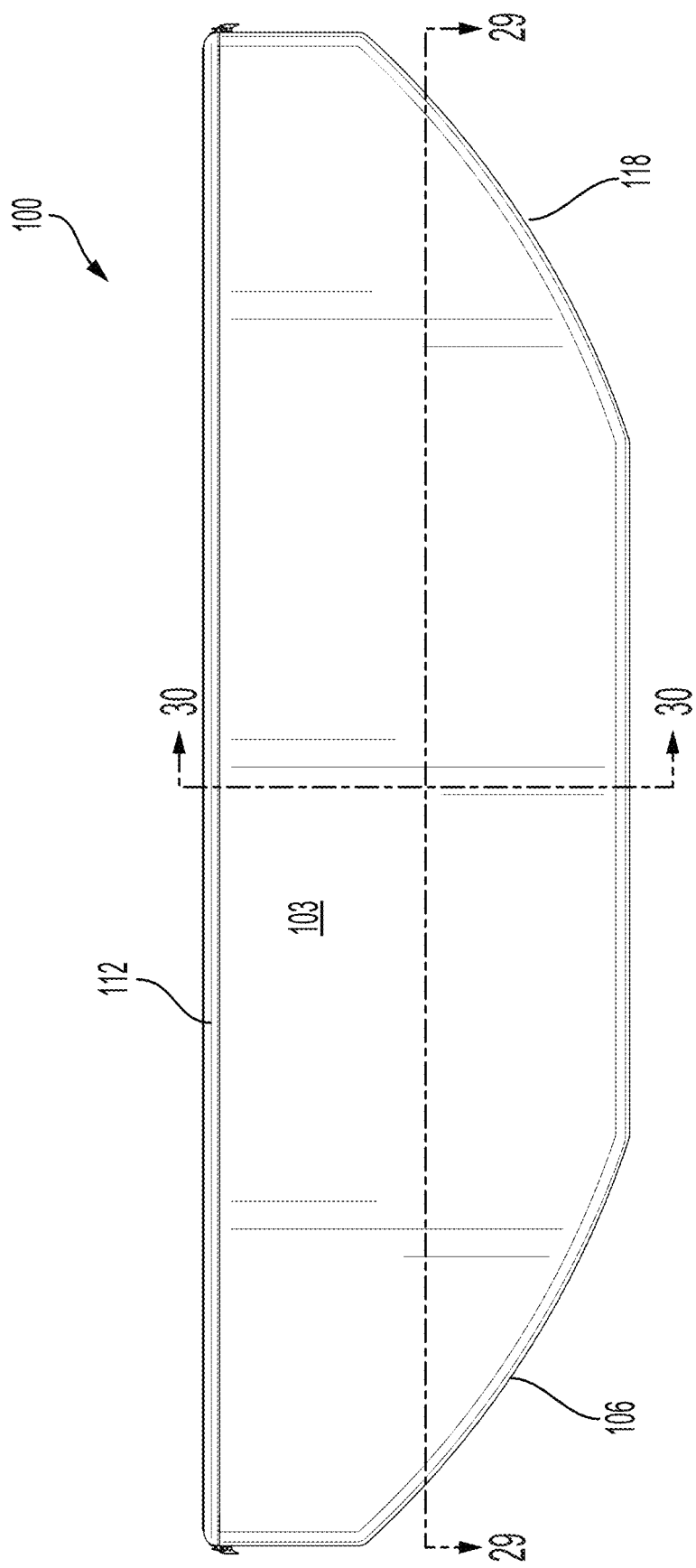
FIG. 23 is a front view of a cargo container, according to an example.
Figure 24:
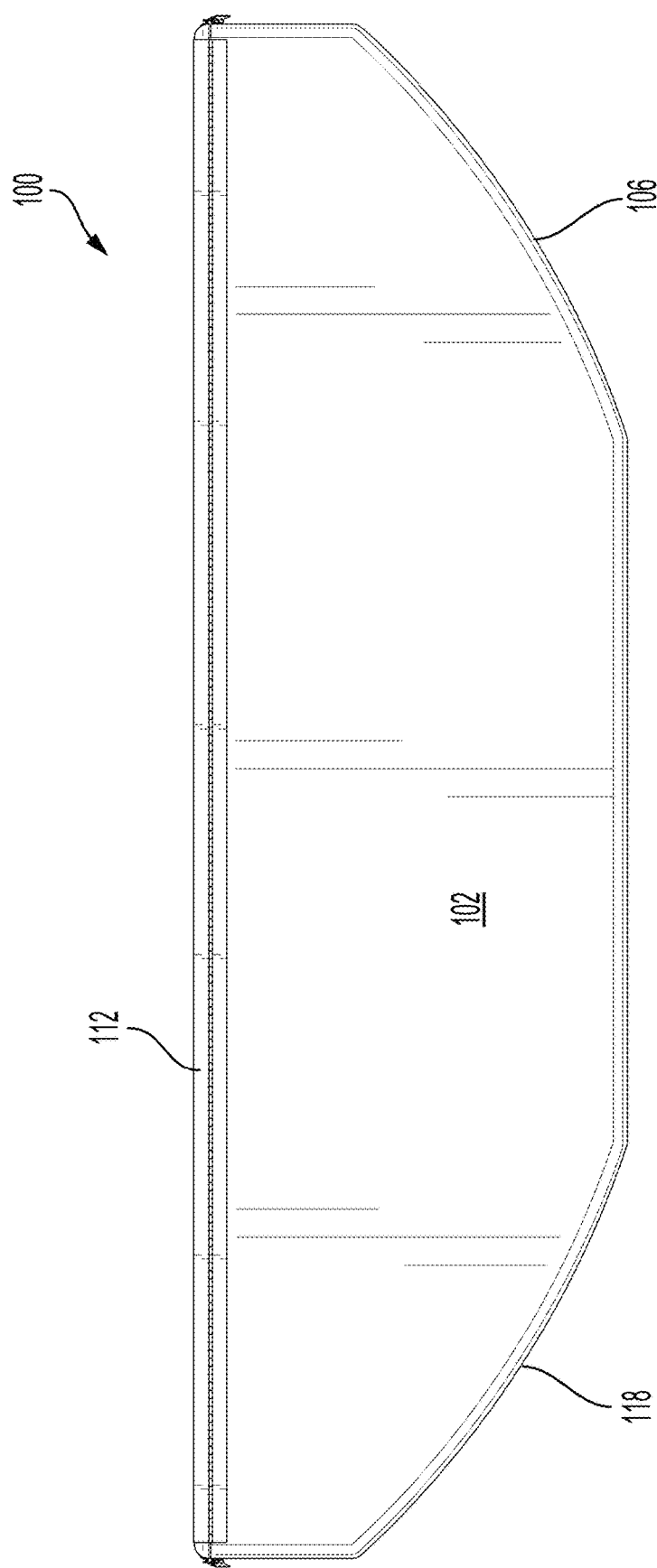
FIG. 24 is a rear view of a cargo container, according to an example.
Figure 25:
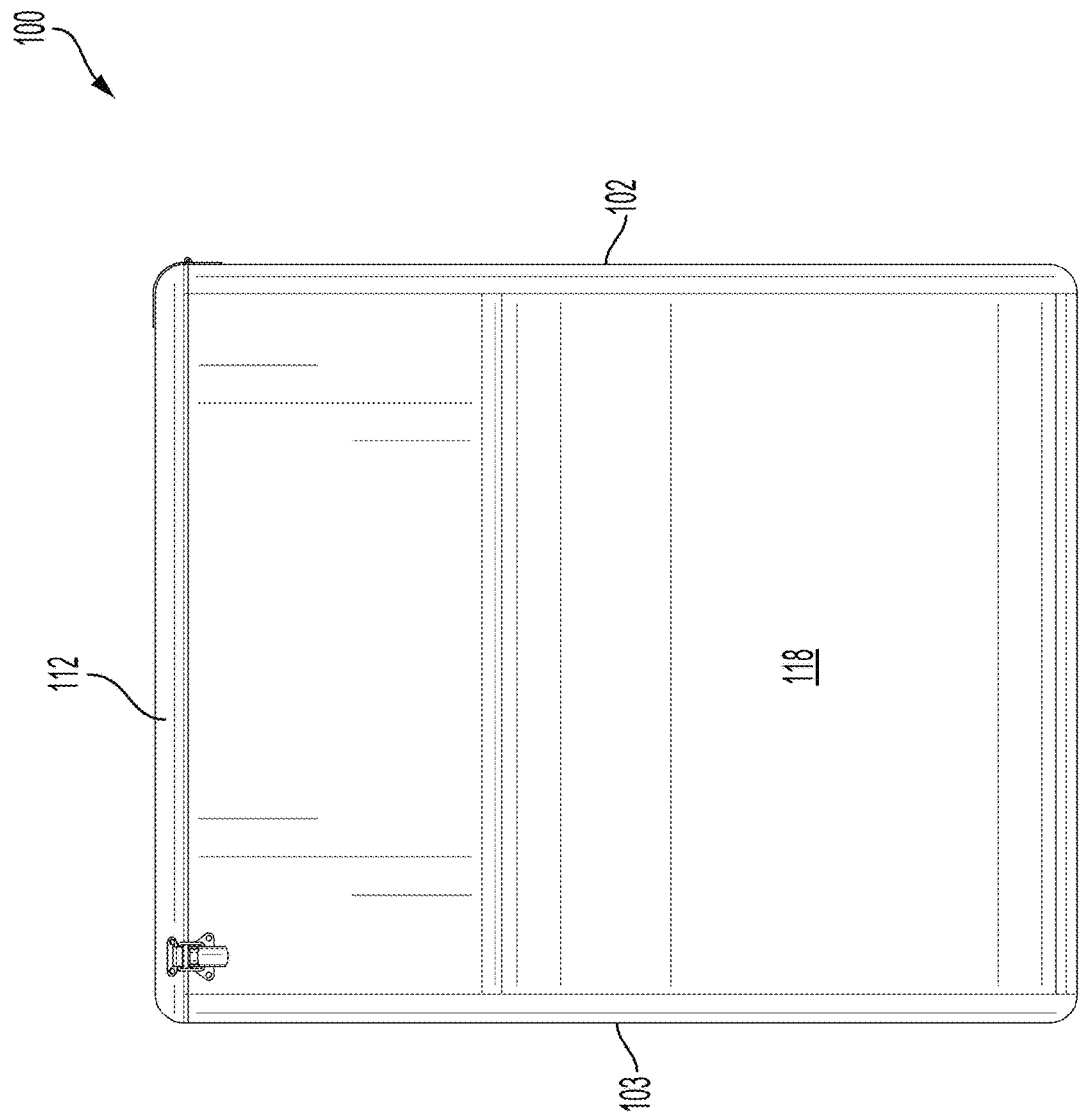
FIG. 25 is a right side view of a cargo container, according to an example.
Figure 26:
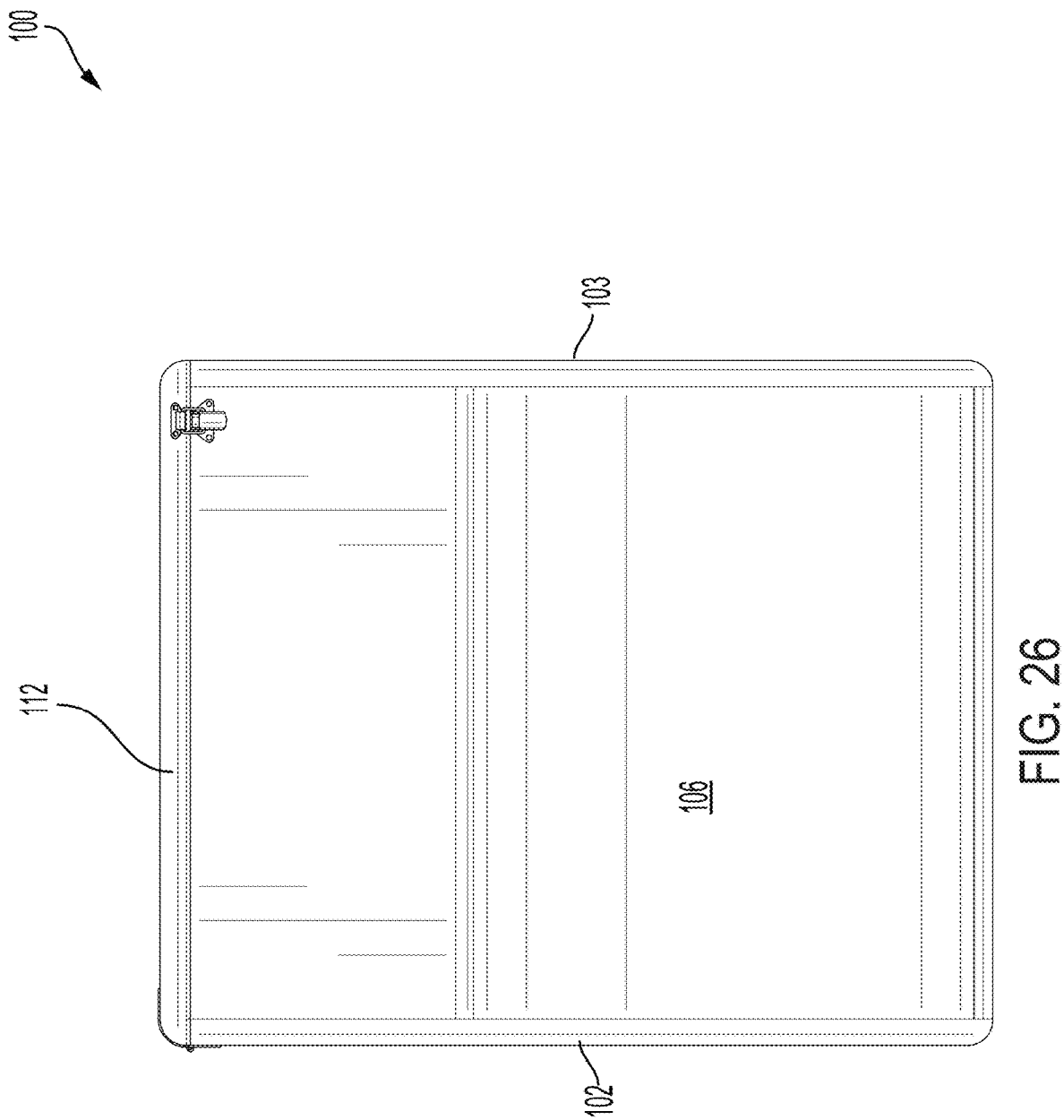
FIG. 26 is a left side view of a cargo container, according to an example.
Figure 27:
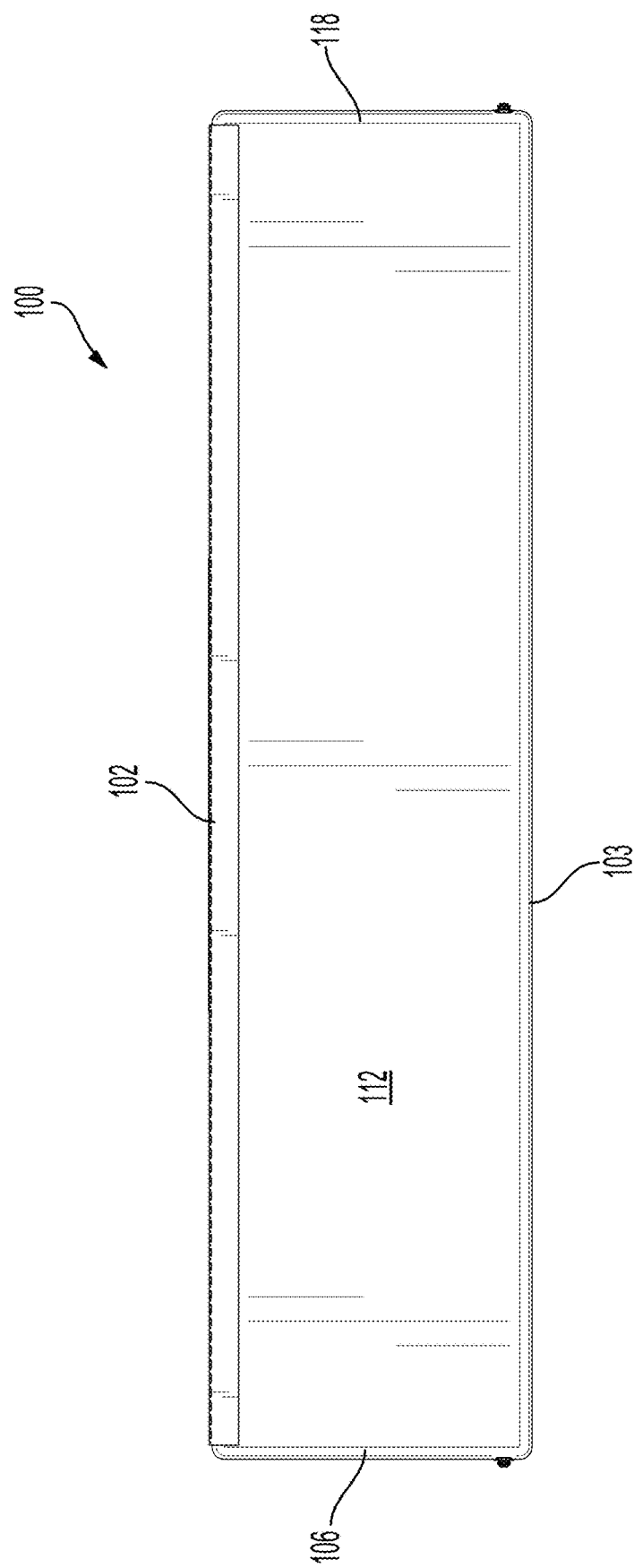
FIG. 27 is a top view of a cargo container, according to an example.
Figure 28:
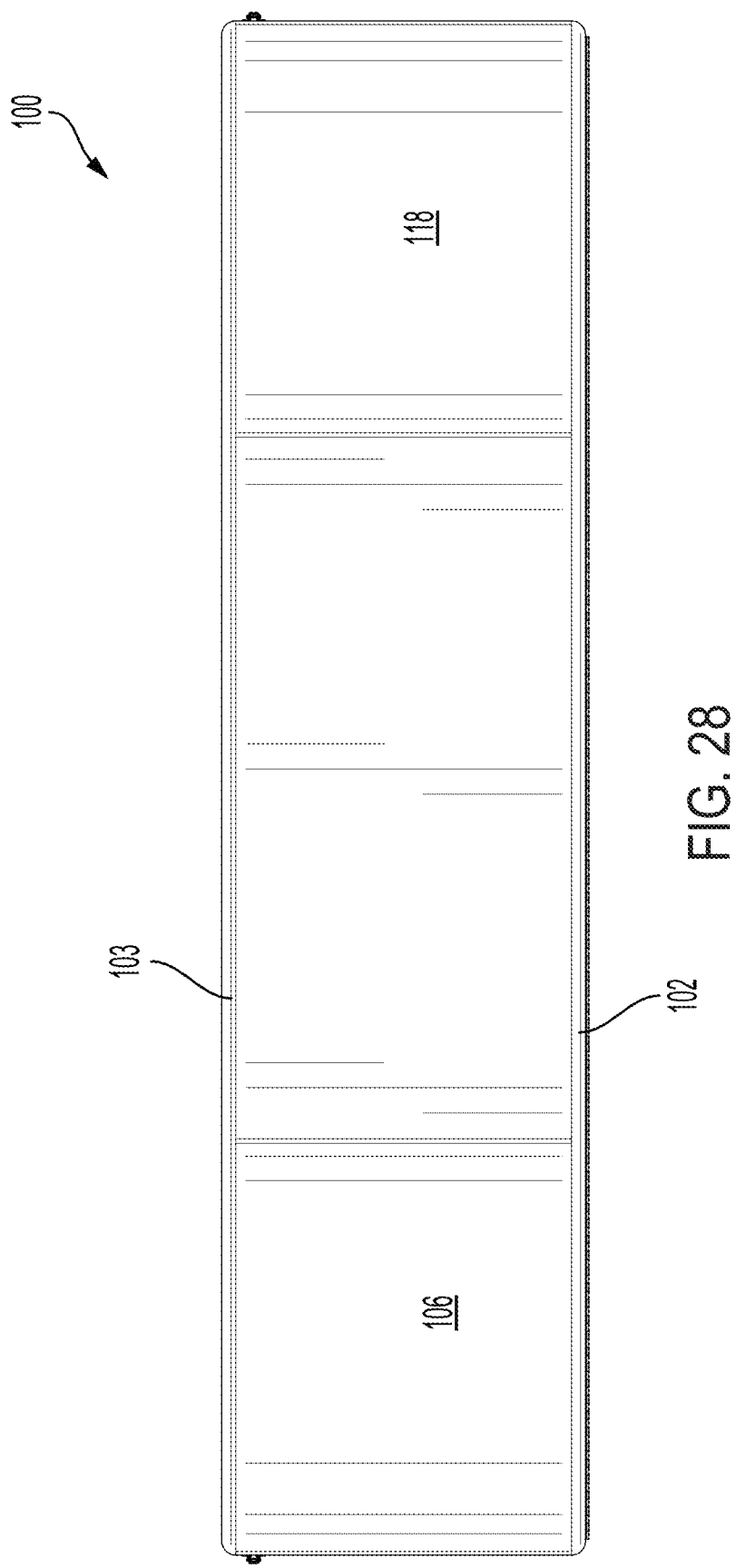
FIG. 28 is a bottom view of a cargo container, according to an example.
Figure 29:
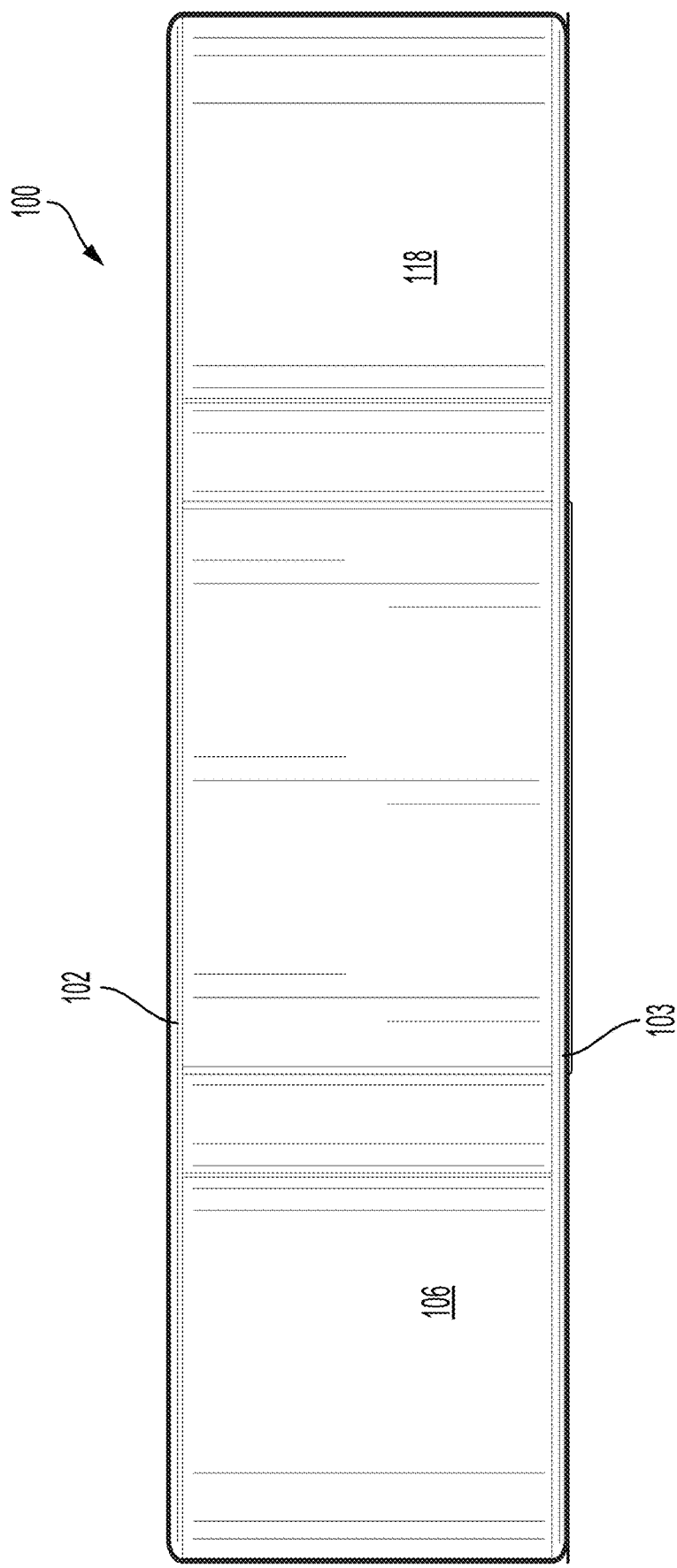
FIG. 29 is a cross sectional view of a cargo container, according to an example.

FIG. 14 is a front view of the cargo container 100.
FIG. 15 is a rear view of the cargo container 100.
FIG. 16 is a right side view of the cargo container 100.
FIG. 17 is a left side view of the cargo container 100.
FIG. 18 is a top view of the cargo container 100.
FIG. 19 is a bottom view of the cargo container 100.
FIG. 20 is a cross sectional view of the cargo container 100.
FIG. 21 is a cross sectional view of the cargo container 100.
FIG. 22 is a perspective view of the cargo container 100. In FIGS. 22-30, the cargo container 100 does not include the base plate 121.
FIG. 23 is a front view of the cargo container 100.
FIG. 24 is a rear view of the cargo container 100.
FIG. 25 is a right side view of the cargo container 100.
FIG. 26 is a left side view of the cargo container 100.
FIG. 27 is a top view of the cargo container 100.
FIG. 28 is a bottom view of the cargo container 100.
FIG. 29 is a cross sectional view of the cargo container 100.
FIG. 30 is a cross sectional view of the cargo container 100.

Examples of the present disclosure can thus relate to one of the enumerated clauses (ECs) listed below.

EC 1 is a cargo container for carrying items in an aircraft, the cargo container comprising: a first sidewall comprising a first length; a second sidewall comprising a second length extending transversely from the first sidewall, wherein the first length is greater than the second length; a base sidewall extending from the first sidewall and the second sidewall, wherein the base sidewall is configured to support the cargo container on a cargo support surface of the aircraft; and a lid configured to couple to the first sidewall, the second sidewall, or the base sidewall to at least partially cover a cavity formed by the first sidewall, the second sidewall, and the base sidewall.

EC 2 is the cargo container of EC 1, wherein the first length is at least four times that of the second length.

EC 3 is the cargo container of any of ECs 1-2, wherein the second sidewall comprises a panel portion that extends in a direction that corresponds to a sidewall of a cargo container area of the aircraft.

EC 4 is the cargo container of EC 3, wherein the panel portion is curved.

EC 5 is the cargo container of any of ECs 1-4, wherein the second sidewall transitions from being perpendicular to the base sidewall to being parallel with the base sidewall.

EC 6 is the cargo container of any of ECs 1-5, further comprising a third sidewall extending from the first sidewall and opposite the second sidewall, wherein the second sidewall and the third sidewall together exhibit reflectional symmetry.

EC 7 is the cargo container of any of ECs 1-6, wherein the first sidewall, the second sidewall, and the base sidewall are formed of a unitary body.

EC 8 is the cargo container of any of ECs 1-7, wherein the base sidewall comprises a low-friction material.

EC 9 is the cargo container of any of ECs 1-8, further comprising a base plate fastened to the base sidewall.

EC 10 is the cargo container of EC 9, further comprising: a first rub strip comprising a low friction material on a first side of the base plate; and a second rub strip comprising the low friction material on a second side of the base plate, wherein the second side is opposite the first side.

EC 11 is the cargo container of any of ECs 1-10, further comprising: a first flexible handle on a first end of the cargo container; and a second flexible handle on a second end of the cargo container that is opposite the first end.

EC 12 is the cargo container of any of ECs 1-11, further comprising: a first linkage device of a first type that is coupled to a first side of the cargo container; and a second linkage device of a second type that is coupled to a second side of the cargo container that is opposite the first side, wherein the first linkage device is configured to be coupled to a linkage device of the second type that is coupled to a second cargo container, and wherein the second linkage device is configured to be coupled to a linkage device of the first type that is coupled to a third cargo container.

EC 13 is the cargo container of any of ECs 1-12, further comprising a first lip portion that is substantially parallel to the first sidewall and extends from the base sidewall.

EC 14 is the cargo container of EC 13, further comprising a second lip portion that is substantially parallel to the first sidewall and extends from the second sidewall.

EC 15 is the cargo container of EC 14, further comprising a flexible cover configured to be fastened to the first lip portion and the second lip portion to at least partially cover the cavity.

EC 16 is the cargo container of EC 15, wherein the flexible cover and the lid together are configured to completely cover the cavity.

EC 17 is cargo container of any of ECs 1-16, further comprising: a third sidewall extending from the first sidewall and opposite the second sidewall, wherein the second sidewall and the third sidewall together exhibit reflectional symmetry; a base plate fastened to the base sidewall; a first rub strip comprising a low friction material on a first side of the base plate; a second rub strip comprising the low friction material on a second side of the base plate, wherein the second side is opposite the first side; a first flexible handle on a first end of the cargo container; a second flexible handle on a second end of the cargo container that is opposite the first end; a first linkage device of a first type that is coupled to a first side of the cargo container; and a second linkage device of a second type that is coupled to a second side of the cargo container that is opposite the first end, wherein the first linkage device is configured to be coupled to a linkage device of the second type that is coupled to a second cargo container, and wherein the second linkage device is configured to be coupled to a linkage device of the first type that is coupled to a third cargo container, wherein the first length is at least four times that of the second length, and wherein the second sidewall comprises a panel portion that extends in a direction that corresponds to a sidewall cargo surface of the aircraft.

EC 18 is an aircraft comprising: a fuselage; a cargo container area extending through the fuselage, the cargo container area defined by a cargo support surface and opposing sidewalls extending from the cargo support surface; and a plurality of cargo containers within the cargo container area, wherein each cargo container of the plurality of cargo containers comprises opposing sidewalls that extend in a direction that correspond to the opposing sidewalls of the cargo container area.

EC 19 is the aircraft of EC 18, wherein each cargo container of the plurality of cargo containers is formed of a unitary body.

EC 20 is a method of manufacturing a cargo container, the method comprising: performing a rotational molding process to form a closed container; removing a portion of the closed container, thereby forming a lid and an open container; and attaching the lid to the open container such that the lid can rotate with respect to the open container, thereby forming the cargo container.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to explain the principles of the examples, the practical application, and to enable others of ordinary skill in the art to understand the disclosure for various examples with various modifications as are suited to the particular use contemplated.

What is claimed is:

1. A cargo container configured for carrying items in an aircraft, the cargo container comprising:
   a first sidewall comprising a first length;
   a second sidewall comprising a second length extending transversely from the first sidewall, wherein the first length is greater than the second length;
   a base sidewall extending from the first sidewall and the second sidewall, wherein the base sidewall is configured to support the cargo container on a cargo support surface of the aircraft;
   a lid configured to couple to the first sidewall or the second sidewall to at least partially cover a cavity formed by the first sidewall, the second sidewall, and the base sidewall;
   a first linkage device of a first type that is coupled to a first side of the cargo container; and
   a second linkage device of a second type that is coupled to a second side of the cargo container that is opposite the first side, wherein the first linkage device is configured to be coupled to a third linkage device of the second type that is coupled to a second cargo container, and wherein the second linkage device is configured to be coupled to a fourth linkage device of the first type that is coupled to a third cargo container.

2. The cargo container of claim 1, wherein the first length is at least four times that of the second length.

3. The cargo container of claim 1, wherein the second sidewall comprises a panel portion that extends in a direction that corresponds to a sidewall of a cargo container area of the aircraft.

4. The cargo container of claim 3, wherein the panel portion is curved.

5. The cargo container of claim 1, wherein the second sidewall transitions from being perpendicular to the base sidewall to being parallel with the base sidewall.

6. The cargo container of claim 1, further comprising a third sidewall extending from the first sidewall and opposite the second sidewall, wherein the second sidewall and the third sidewall together exhibit reflectional symmetry.

7. The cargo container of claim 1, wherein the first sidewall, the second sidewall, and the base sidewall are formed of a unitary body.

8. The cargo container of claim 1, wherein the base sidewall comprises a low-friction material.

9. The cargo container of claim 1, further comprising a base plate fastened to the base sidewall.

10. The cargo container of claim 9, further comprising:
    a first rub strip comprising a low friction material on a first side of the base plate; and
    a second rub strip comprising the low friction material on a second side of the base plate, wherein the second side is opposite the first side.

11. The cargo container of claim 1, further comprising:
    a first flexible handle on a first end of the cargo container; and
    a second flexible handle on a second end of the cargo container that is opposite the first end.

12. The cargo container of claim 1, further comprising a first lip portion that is substantially parallel to the first sidewall and extends from the base sidewall.

13. The cargo container of claim 12, further comprising a second lip portion that is substantially parallel to the first sidewall and extends from the second sidewall.

14. The cargo container of claim 13, further comprising a flexible cover configured to be fastened to the first lip portion and the second lip portion to at least partially cover the cavity.

15. The cargo container of claim 14, further comprising a third sidewall extending from the first sidewall and opposite the second sidewall, wherein the flexible cover and the lid together are configured to completely cover the cavity.

16. The cargo container of claim 1, further comprising:
    a third sidewall extending from the first sidewall and opposite the second sidewall, wherein the second sidewall and the third sidewall together exhibit reflectional symmetry;
    a base plate fastened to the base sidewall;

a first rub strip comprising a low friction material on a first side of the base plate;

a second rub strip comprising the low friction material on a second side of the base plate, wherein the second side is opposite the first side;

a first flexible handle on a first end of the cargo container; and a second flexible handle on a second end of the cargo container that is opposite the first end;

wherein the first length is at least four times that of the second length, and wherein the second sidewall comprises a panel portion that extends in a direction that corresponds to a sidewall cargo surface of the aircraft.

17. An aircraft comprising:

a fuselage;

a cargo container area extending through the fuselage, the cargo container area defined by a cargo support surface and opposing sidewalls extending from the cargo support surface; and a plurality of cargo containers within the cargo container area, wherein each cargo container of the plurality of cargo containers comprises:

a first sidewall comprising a first length;

a second sidewall comprising a second length extending transversely from the first sidewall, wherein the first length is greater than the second length;

a base sidewall extending from the first sidewall and the second sidewall, wherein the base sidewall is configured to support the cargo container on the cargo support surface;

a lid configured to couple to the first sidewall or the second sidewall to at least partially cover a cavity formed by the first sidewall, the second sidewall, and the base sidewalk a first linkage device of a first type that is coupled to a first side of the cargo container; and a second linkage device of a second type that is coupled to a second side of the cargo container that is opposite the first side, wherein the first linkage device is configured to be coupled to a third linkage device of the second type that is coupled to a second cargo container, and wherein the second linkage device is configured to be coupled to a fourth linkage device of the first type that is coupled to a third cargo container.

18. The aircraft of claim 17, wherein each cargo container of the plurality of cargo containers is formed of a unitary body.

19. The aircraft of claim 17, wherein the second sidewall transitions from being perpendicular to the base sidewall to being parallel with the base sidewall.

20. The aircraft of claim 17, wherein each cargo container of the plurality of cargo containers further comprises:

a first flexible handle on a first end of the cargo container; and a second flexible handle on a second end of the cargo container that is opposite the first end.

* * * * *